US011850788B2

(12) United States Patent
Tsuchiya et al.

(10) Patent No.: US 11,850,788 B2
(45) Date of Patent: Dec. 26, 2023

(54) DEVICE AND METHOD FOR PRODUCING RESIN CONTAINER

(71) Applicant: NISSEI ASB MACHINE CO., LTD., Nagano (JP)

(72) Inventors: Yoichi Tsuchiya, Nagano (JP); Manabu Ogihara, Nagano (JP); Atsushi Nagasaki, Nagano (JP); Kazuhiro Horiuchi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 192 days.

(21) Appl. No.: 17/427,401

(22) PCT Filed: Jan. 31, 2020

(86) PCT No.: PCT/JP2020/003653
§ 371 (c)(1),
(2) Date: Jul. 30, 2021

(87) PCT Pub. No.: WO2020/158920
PCT Pub. Date: Aug. 6, 2020

(65) Prior Publication Data
US 2022/0097286 A1 Mar. 31, 2022

(30) Foreign Application Priority Data

Jan. 31, 2019 (JP) ................................. 2019-015971
Feb. 19, 2019 (JP) ................................. 2019-027545
Sep. 30, 2019 (JP) ................................. 2019-178433

(51) Int. Cl.
*B29C 49/06* (2006.01)
*B29C 49/64* (2006.01)
(Continued)

(52) U.S. Cl.
CPC .......... *B29C 49/6427* (2013.01); *B29C 49/06* (2013.01); *B29C 49/28* (2013.01); *B29K 2067/003* (2013.01); *B29L 2031/7158* (2013.01)

(58) Field of Classification Search
CPC ... B29C 49/06; B29C 49/061; B29C 49/6427; B29C 49/63
See application file for complete search history.

(56) References Cited

U.S. PATENT DOCUMENTS 6,555,046 B1 *  4/2003  Koda .................. B29C 49/6454
                                                         264/537
2008/0277840 A1 * 11/2008  Yanagimachi ........ B29C 49/064
                                                         264/519
(Continued)

FOREIGN PATENT DOCUMENTS

CN    103648747 A    3/2014
CN    107614239 A    1/2018
(Continued)

OTHER PUBLICATIONS

International Search Report issued in International Patent Application No. PCT/JP2020/003653, dated Apr. 14, 2020, along with an English translation thereof.
(Continued)

*Primary Examiner* — Robert B Davis
(74) *Attorney, Agent, or Firm* — Greenblum & Bernstein, P.L.C.

(57) ABSTRACT

In a manufacturing apparatus for manufacturing a resin container which includes an injection molding part configured to injection-mold a preform, a temperature adjustment part configured to adjust a temperature of the preform molded in the injection molding part, and a blow molding part configured to blow-mold the preform whose temperature has been adjusted in the temperature adjustment part,
(Continued)

the preform is carried into the temperature adjustment part before an outer surface temperature of the preform molded in the injection molding part becomes higher than an inner surface temperature of the preform molded in the injection molding part, and the preform is cooled to be lowered within a range equal to or higher than 10° C. and equal to or lower than 50° C. in the temperature adjustment part.

5 Claims, 12 Drawing Sheets

(51) Int. Cl.
  *B29C 49/28* (2006.01)
  *B29K 67/00* (2006.01)
  *B29L 31/00* (2006.01)

(56) References Cited

U.S. PATENT DOCUMENTS

| | | |
|---|---|---|
| 2011/0070388 A1 | 3/2011 | Schneider et al. |
| 2012/0076965 A1 | 3/2012 | Silvers et al. |
| 2013/0236589 A1 | 9/2013 | Yamaguchi et al. |
| 2014/0131920 A1 | 5/2014 | Nakahara |
| 2014/0302191 A1 | 10/2014 | Yamaguchi et al. |
| 2015/0209996 A1 | 7/2015 | Silvers et al. |
| 2015/0328817 A1 | 11/2015 | Yamaguchi et al. |
| 2016/0361860 A1 | 12/2016 | Nakahara |
| 2018/0029280 A1 | 2/2018 | Morikami |
| 2018/0079127 A1 | 3/2018 | Aoki |
| 2019/0061222 A1 | 2/2019 | Usami et al. |
| 2022/0009145 A1 | 1/2022 | Tsuchiya |
| 2022/0097286 A1 | 3/2022 | Tsuchiya et al. |

FOREIGN PATENT DOCUMENTS

| | | | |
|---|---|---|---|
| CN | 108349143 A | 7/2018 | |
| JP | 52-91067 A | 8/1977 | |
| JP | 4-62027 A | 2/1992 | |
| JP | 4-62028 A | 2/1992 | |
| JP | 04-065216 A | 3/1992 | |
| JP | 5-185493 A | 7/1993 | |
| JP | 05-330535 A | 12/1993 | |
| JP | 6-315973 A | 11/1994 | |
| JP | 2007-276493 | 10/2007 | |
| JP | 4582464 B2 | 9/2010 | |
| JP | 2016-199053 A | 12/2016 | |
| WO | WO-9739874 A1 * | 10/1997 | ......... B29C 49/6427 |
| WO | 2012/057016 A1 | 5/2012 | |
| WO | 2013/012067 A1 | 1/2013 | |
| WO | 2017/098673 A1 | 6/2017 | |
| WO | 2020/158920 | 8/2020 | |

OTHER PUBLICATIONS

Written Opinion of the International Searching Authority issued in International Application No. PCT/JP2020/003653, dated Apr. 14, 2020, along with an English translation thereof.

Office Action issued in Chinese counterpart application No. 202080023615.X dated Nov. 30, 2022 and English language translation thereof.

Extended European Search Report issued on European Patent Application No. 20749786.8 dated Sep. 13, 2022.

Office Action dated Aug. 24, 2023 in Korean family member application No. 10-2021-7024558, with English language translation thereof.

Office Action issued in Corresponding JP Patent Application No. 2020-159284, dated Sep. 28, 2023, along with an English translation thereof.

Office Action issued in Corresponding CN Patent Application No. 202080023615.X, dated Oct. 31, 2023, along with an English translation thereof.

* cited by examiner

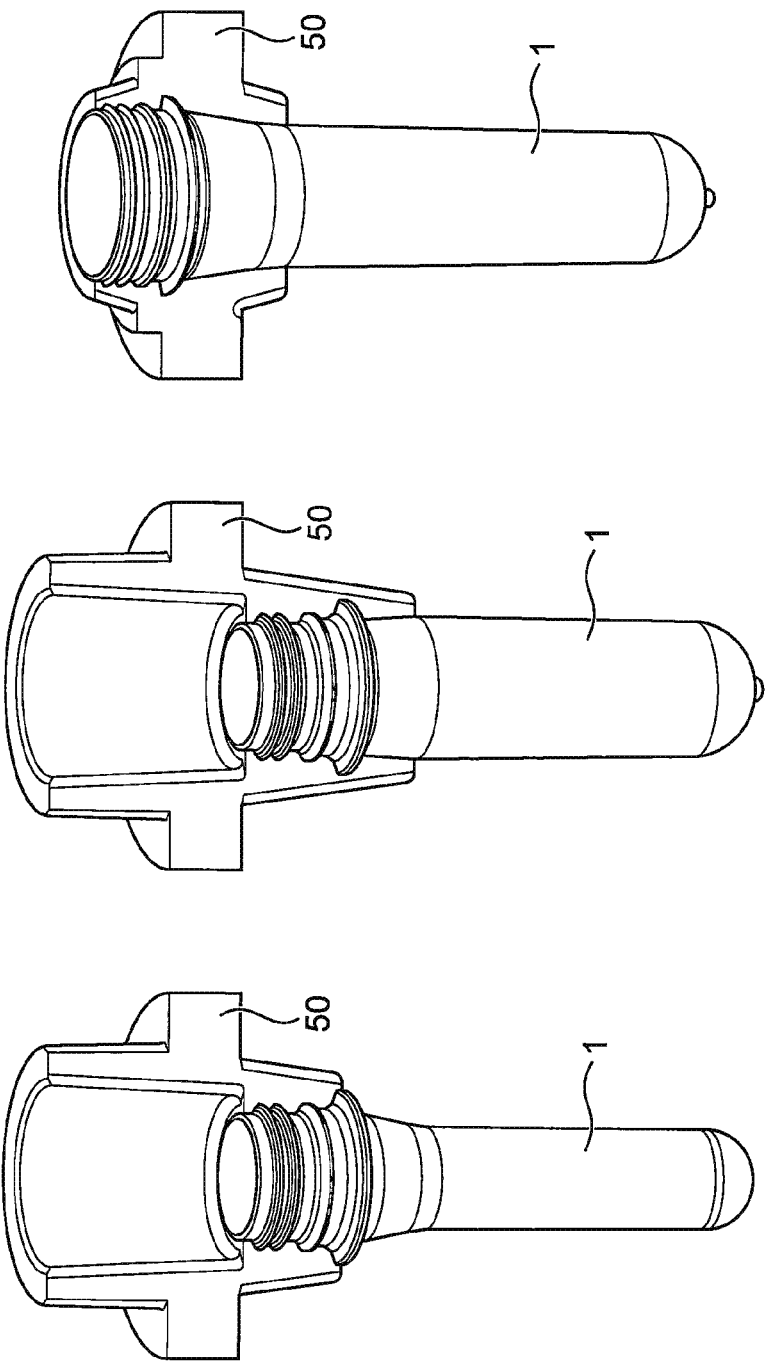

DEVICE AND METHOD FOR PRODUCING RESIN CONTAINER

TECHNICAL FIELD

The present invention relates to a manufacturing apparatus and a manufacturing method for manufacturing a resin container by a hot parison type blow molding method. Specifically, the present invention relates to a manufacturing apparatus and a manufacturing method for manufacturing a resin container by a hot parison type blow molding method, which enable a resin container having good appearance and physical properties to be manufactured even if a manufacturing time is shortened.

BACKGROUND ART

Conventionally, a blow molding apparatus including an injection molding part configured to injection-mold a preform, a temperature adjustment part configured to adjust a temperature of the preform molded in the injection molding part, and a blow molding part configured to blow-mold the preform whose temperature has been adjusted in the temperature adjustment part is known (for example, refer to Patent Literature 1). This type of the blow molding apparatus is an apparatus where the temperature adjustment part is added to a conventional blow molding apparatus (for example, refer to Patent Literature 2) mainly having the injection molding part and the blow molding part. The preform immediately after molded in the injection molding part does not have a temperature distribution suitable for blow molding.

Therefore, the temperature adjustment part capable of more aggressively adjusting a temperature of the preform is provided between the injection molding part and the blow molding part, so that the temperature of the preform can be adjusted to a temperature suitable for blow molding. Note that, the temperature adjustment part uses a heating pot mold (heating block) and a heating rod, and adjusts the temperature of the preform by heating the preform in a non-contact manner.

In addition, there is a temperature adjustment method capable of favorably molding a container having a thick bottom portion by cooling only a bottom portion of a preform in a short time and locally. Specifically, suggested is a blow molding apparatus where outer peripheral surfaces of a bottom portion of the preform and a lower part of the body portion continuing to the bottom portion are mechanically brought into close contact and securely cooled with a cooling pot, and the body portion except the lower part of the body portion continuing to the bottom portion is heated to a predetermined temperature by the heating block, so that a container including a bottom portion having a desired thickness and a body portion having a wall portion stretched in a uniform and thin thickness when performing blow molding is manufactured (for example, refer to Patent Literature 3).

In addition, suggested is a blow molding apparatus configured to shorten an injection molding time (specifically, a cooling time) that determines a molding cycle time by cooling a preform in an injection molding part and further cooling the preform in a temperature adjustment part (for example, refer to Patent Literature 4).

CITATION LIST

Patent Literature

Patent Literature 1: JP-A-H06-315973
Patent Literature 2: WO 2017/098673 A1
Patent Literature 3: WO 2013/012067 A1
Patent Literature 4: JP-A-H05-185493

SUMMARY OF INVENTION

Technical Problem

However, according to the conventional blow molding apparatus, when the cooling time after injection molding is set short, it is not possible to sufficiently remove temperature unevenness or uniformize the temperature in the temperature adjustment part. For this reason, in a case where a thermoplastic resin (PET (polyethylene terephthalate) and the like), which is likely to crystallize in a temperature zone of the blow molding, is used as a material of the preform, a method capable of manufacturing a high-quality container where thickness unevenness and whitening (cloudiness) are favorably suppressed and a thickness distribution is thus uniform has not been established.

An object of the present invention is to provide a manufacturing apparatus and a manufacturing method for manufacturing a resin container, capable of manufacturing a container of good quality even by a hot parison type blow molding method where a molding cycle time is shortened.

Solution to Problem

The present invention provides a manufacturing apparatus for manufacturing a resin container, the manufacturing apparatus including: an injection molding part configured to injection-mold a preform; and a temperature adjustment part configured to adjust a temperature of the preform molded in the injection molding part, in which the manufacturing apparatus is configured to blow-mold the preform whose temperature has been adjusted in the temperature adjustment part, the preform is carried into the temperature adjustment part before an outer surface temperature of the preform molded in the injection molding part becomes higher than an inner surface temperature of the preform molded in the injection molding part, and in the temperature adjustment part, the preform is cooled so that at least the outer surface temperature of the preform is lowered within a range of equal to or higher than 10° C. and equal to or lower than 50° C. as compared to the outer surface temperature of the preform when the preform is carried into the temperature adjustment part.

In this case, in a case where a glass transition temperature of a resin material for molding the preform is equal to or higher than 50° C. and equal to or lower than 150° C. and a thickness of the preform is equal to or greater than 1.5 mm and equal to or smaller than 4.0 mm, the preform may be carried into the temperature adjustment part in a state where the outer surface temperature of the preform is equal to or higher than 110° C. and equal to or lower than 150° C. In a case where a glass transition temperature of a resin material for molding the preform is equal to or higher than 50° C. and equal to or lower than 150° C. and a thickness of the preform is equal to or greater than 3.0 mm and equal to or smaller than 10.0 mm, the preform may be carried into the temperature adjustment part in a state where the outer surface temperature of the preform is equal to or higher than 100° C. and equal to or lower than 140° C. The temperature adjustment part may be configured cool the preform by sandwiching the preform with a temperature adjustment core mold and a temperature adjustment cavity mold to compressdeform the preform. The temperature adjustment part may be configured to cool the preform by circulating air inside the preform.

Further, the present invention provides a manufacturing method for manufacturing a resin container, the manufacturing method including: injection-molding a preform; adjusting a temperature of the preform to which the injection-molding has been performed in a temperature adjustment part; and blow-molding the preform whose temperature has been adjusted, in which the preform is carried into the temperature adjustment part before an outer surface temperature of the preform to which the injection-molding has been performed becomes higher than an inner surface temperature of the preform to which the injection-molding has been performed, and in the temperature adjustment part, the preform is cooled so that at least the outer surface temperature of the preform is lowered within a temperature range from 10° C. to 50° C. as compared to the outer surface temperature of the preform when the preform is carried into the temperature adjustment part.

In this case, in a case where a glass transition temperature of a resin material for molding the preform is equal to or higher than 50° C. and equal to or lower than 150° C. and a thickness of the preform is equal to or greater than 1.5 mm and equal to or smaller than 4.0 mm, the preform may be carried into the temperature adjustment part in a state where the outer surface temperature of the preform is equal to or higher than 110° C. and equal to or lower than 150° C. In a case where the glass transition temperature of a resin material for molding the preform is equal to or higher than 50° C. and equal to or lower than 150° C. and the thickness of the preform is equal to or greater than 3.0 mm and equal to or smaller than 10.0 mm, the preform may be carried into the temperature adjustment part in a state where the outer surface temperature of the preform is equal to or higher than 100° C. and equal to or lower than 140° C. The temperature adjustment part may be configured to cool the preform by sandwiching the preform with a temperature adjustment core mold and a temperature adjustment cavity mold to compression-deform the preform. The temperature adjustment part may be configured to cool the preform by circulating air inside the preform.

Advantageous Effects of Invention

According to the present invention, it is possible to provide the manufacturing apparatus and the manufacturing method for manufacturing a resin container, capable of manufacturing a container of good quality even by a hot parison type blow molding method where a molding cycle time is shortened.

BRIEF DESCRIPTION OF DRAWINGS

FIGS. 13(a), 13(b), and 13(c) show examples of a neck mold and a preform.

DESCRIPTION OF EMBODIMENTS

Hereinafter, favorable embodiments of the present invention will be described with reference to the drawings.

First Embodiment

Figure 1:
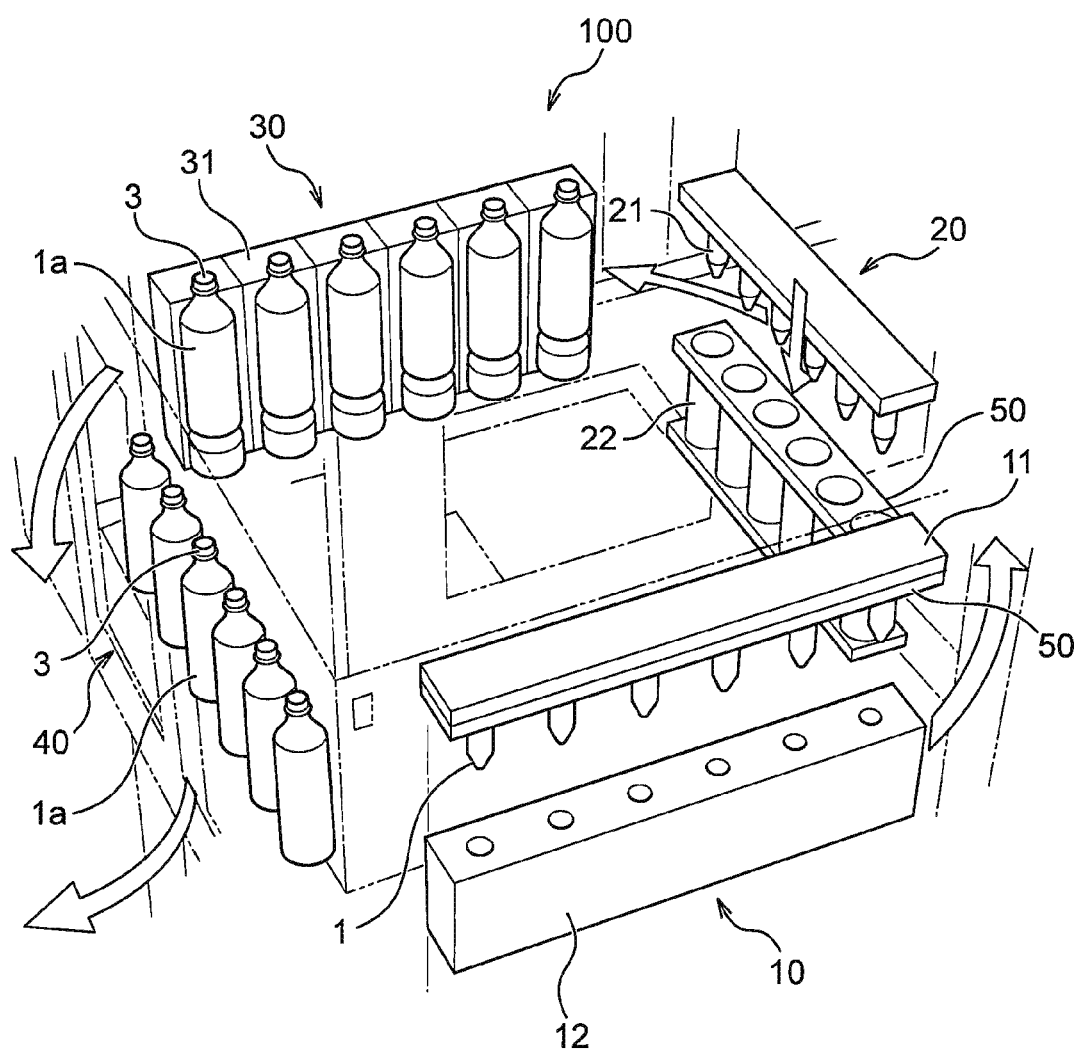
FIG. 1 is a perspective view of a blow molding apparatus (including an injection molding part, a temperature adjustment part, a blow molding part and a take-out part) according to a first embodiment of the present invention.
Figure 2:
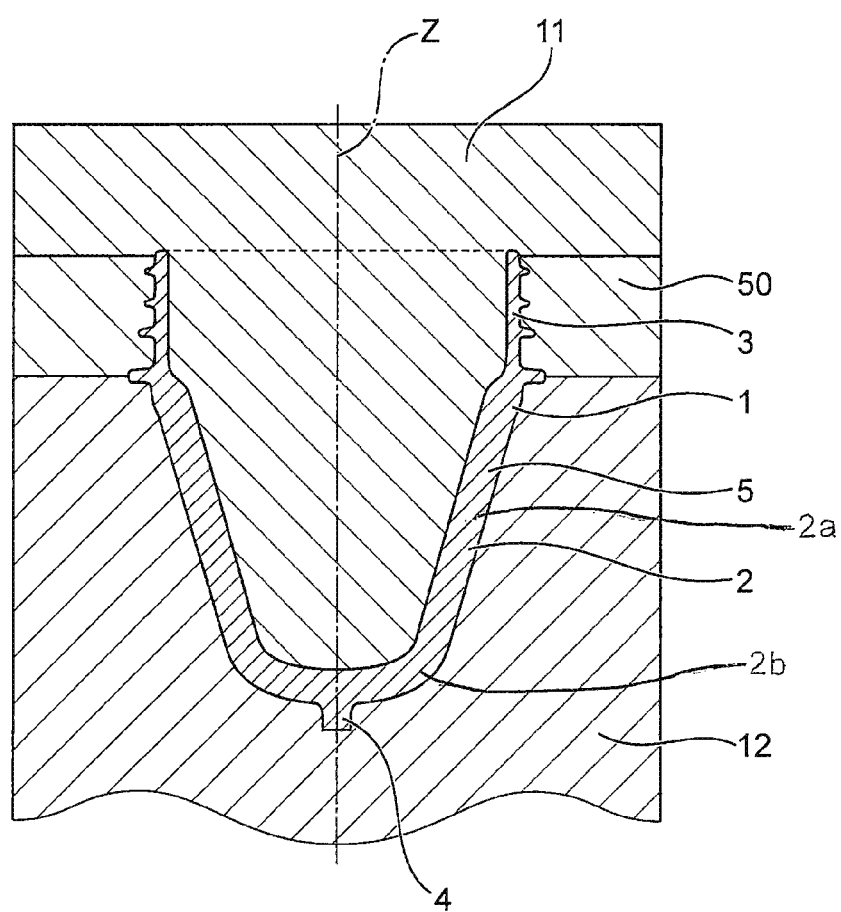
FIG. 2 is an enlarged cross-sectional view of a preform injection-molded in the injection molding part, as seen from the front.
Figure 3:
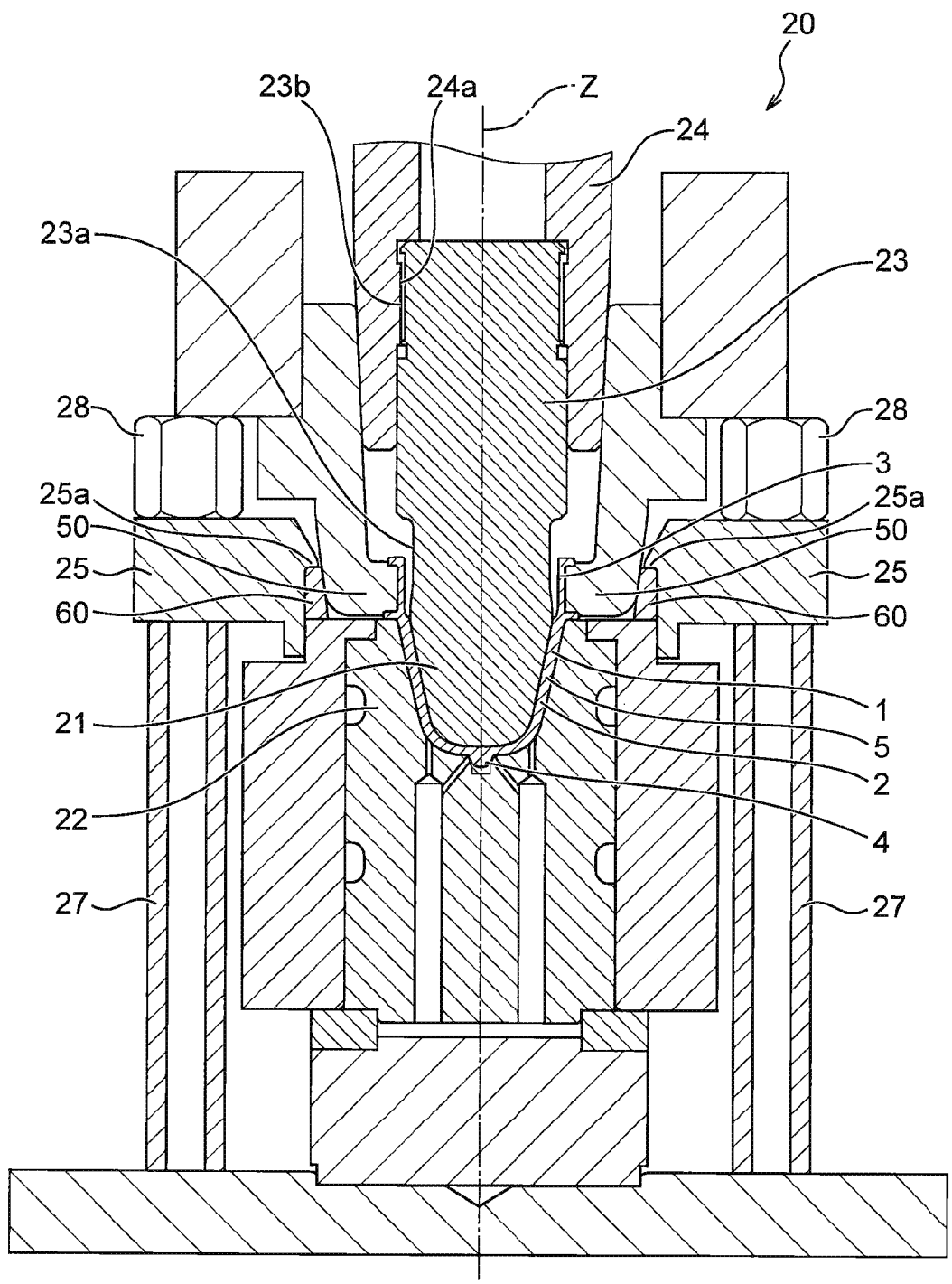
FIG. 3 is a schematic view of the temperature adjustment part.
Figure 4:
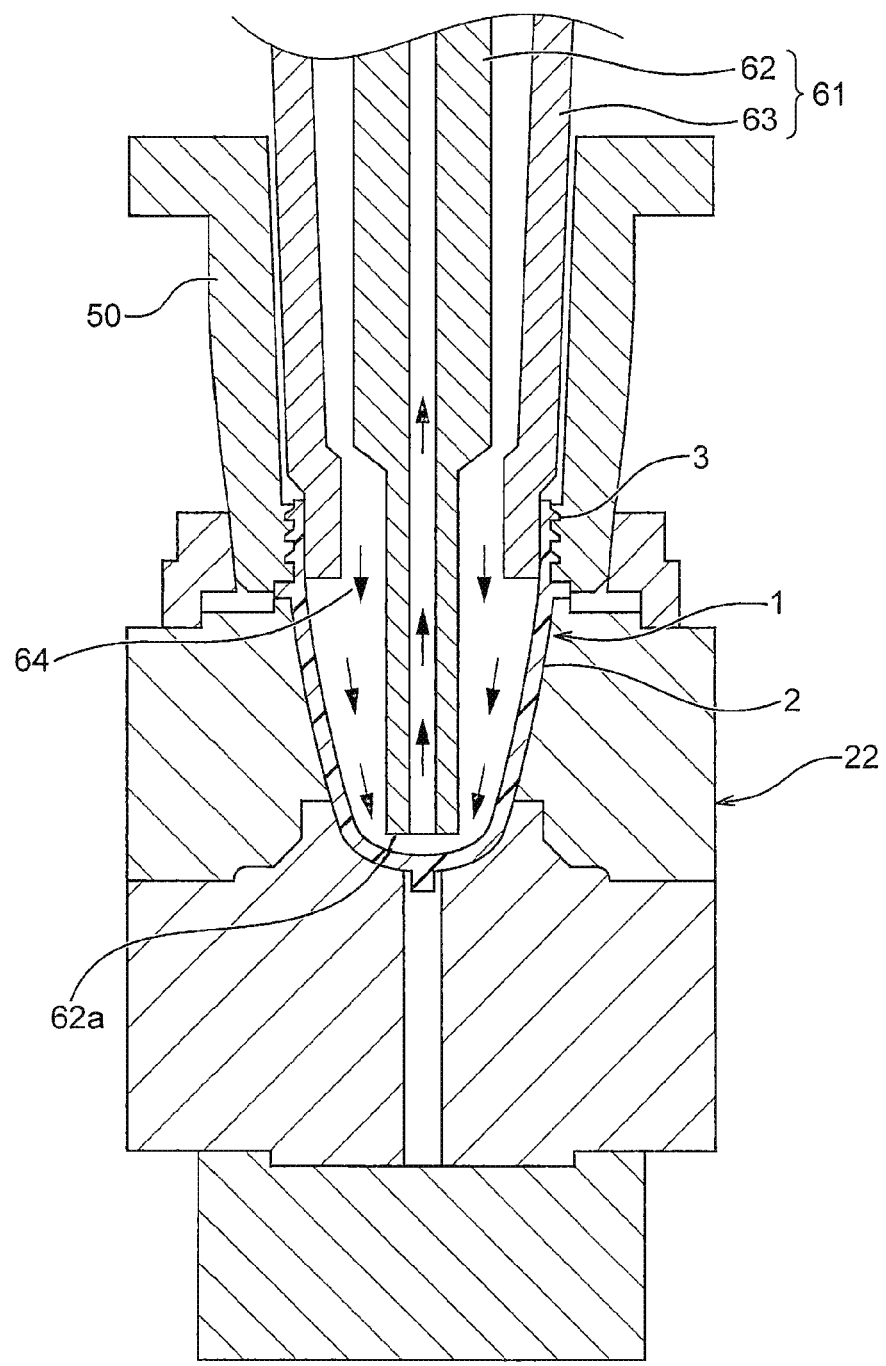
FIG. 4 is a schematic view showing another example of the temperature adjustment part.
Figure 5:
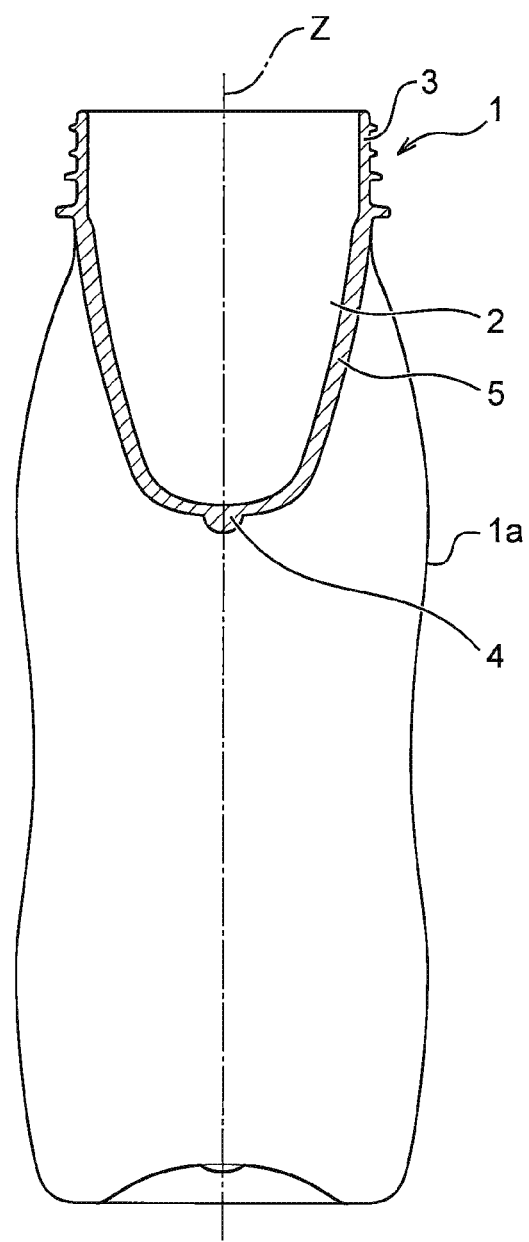
FIG. 5 is a cross-sectional view showing a state where the preform is blow-molded in the blow molding part.

FIG. 1 is a perspective view of a blow molding apparatus (including an injection molding part, a temperature adjustment part, a blow molding part and a take-out part) according to a first embodiment of the present invention, FIG. 2 is an enlarged cross-sectional view of a preform injection-molded in the injection molding part, as seen from the front, FIG. 3 is a cross-sectional view showing a state where the preform is cooled in temperature adjustment part by a temperature adjustment core and a temperature adjustment pot, FIG. 4 is an enlarged cross-sectional view showing a state of cooling the preform in the temperature adjustment part by air, and FIG. 5 is a cross-sectional view showing a state where the preform is blow-molded in the blow molding part.

As shown in FIG. 1, a blow molding apparatus 100 is an apparatus including an injection molding part 10, a temperature adjustment part 20, a blow molding part 30, and a take-out part 40 and configured to manufacture a container 1a by injection-molding a preform 1 and then blow-molding the preform 1.

The injection molding part 10, the temperature adjustment part 20, the blow molding part 30 and the take-out part 40 are arranged in alignment of forming four sides of a square, as seen from above. A rotation plate (not shown) provided with a neck mold 50 (refer to FIG. 3) configured to hold a neck portion 3 (refer to FIG. 2) of a preform 1 molded in the injection molding part 10 is provided above the parts. The rotation plate has four sets of neck molds 50 arranged in alignment of forming four sides of a square, as seen from above. Thereby, when the rotation plate is rotated about a vertical shaft in a counterclockwise direction by 90 degrees above the injection molding part 10, the temperature adjustment part 20, the blow molding part 30 and the take-out part 40, each of the four sets of the neck molds 50 sequentially moves to the injection molding part 10, the temperature adjustment part 20, the blow molding part 30 and the take-out part 40 with the same time, so that each process is performed for the preform 1 held by the neck mold 50 for the same time.

The injection molding part 10 includes an injection core mold 11, an injection cavity mold 12 and an injection device (not shown), and is configured to injection-mold the preform 1. The injection core mold 11 and the injection cavity mold 12 are each provided with a cooling circuit (not shown) through which a cooling medium of about 5° C. to 20° C. flows. As shown in FIG. 2, the preform 1 is formed of a thermoplastic synthetic resin and has a bottomed shape (bottomed cylinder shape) having a neck portion 3 on an opened side and a storage portion 2 (main body portion) 2 on a closed side. The storage portion 2 includes a body portion 2a on the opened side and continuing to the neck portion 3, and a bottom portion 2b positioned on the closed side and continuing to the body portion 2a. The preform 1 is formed into a container 1a (refer to FIG. 5) by blow molding, and has a shape having a thick thickness, which is obtained by shrinking the blow-molded container 1a in an upper and lower direction and in a right and left direction in FIG. 5.

When injection-molding the preform 1, the injection core mold 11, the injection cavity mold 12 and the neck mold 50 are combined to define a space corresponding to the preform 1. At this time, inner surface shapes of the storage portion 2 and neck portion 3 of the preform 1 are formed by the injection core mold 11, an outer surface shape of the storage portion 2 is formed by the injection cavity mold 12, and an outer surface shape of the neck portion 3 is formed by the neck mold 50.

The injection molding part 10 is configured to form a surface layer (also referred to as an outer portion layer, an outer layer or a skin layer) on the storage portion 2 and to mold the preform 1 by heating and melting a material of a thermoplastic synthetic resin (for example, a polyester-based resin such as PET (polyethylene terephthalate) and the like) to high temperatures, injecting (filling) the melted material into a molding space (cavity) defined by the injection core mold 11, the injection cavity mold 12 and the neck mold 50 by the injection device (not shown), and cooling and solidifying the material of a part, which is close to a mold surface (cavity surface), of the injected material to a temperature, for example, about 20° C. lower than a melting point (for example, about 255° C. in the case of PET). At this time, an inner portion layer (also referred to as an inner layer or a core layer) of the storage portion 2 of the preform 1 is set to a temperature (for example, 150° C. to 200° C.) equal to or lower than the melting point and equal to or higher than a glass transition temperature, and is adjusted to have an amount of heat by which the storage portion can be stretched in the blow molding part 30. Note that, in the present embodiment, a molding cycle time, i.e., a molding time of the preform 1 is shortened, as compared to conventional art. Specifically, among an injection time (filling time) and a cooling time relating to the injection molding time of the preform, the cooling time is set significantly shorter than that of the conventional art. For example, the cooling time is set to ⅔ or less, preferably ½ or less, and more preferably ⅓ or less of the injection time.

The injection core mold 11 is formed so that a traverse cross-section of a portion corresponding to the storage portion 2 (more specifically, the body portion 2a) of the preform 1 is smaller than a traverse cross-section of a portion corresponding to the neck portion 3. Thereby, an inner side of the injection-molded preform 1 is formed so that an internal space area of the storage portion 2 in a direction perpendicular to an axis center Z of the preform 1 is smaller than that of the neck portion 3.

In addition, the injection core mold 11 is formed so that a traverse cross-section becomes gradually smaller toward a position on the mold surface (cavity surface) corresponding to the bottom portion 2b of the preform 1. Thereby, the inner side of the injection-molded preform 1 is formed so that the internal space area expanding in the direction perpendicular to the axis center Z of the preform 1 becomes gradually smaller toward the bottom portion 2b of the preform 1.

The preform 1 solidified to some extent (a degree that a skin layer is formed on inner and outer surfaces of the storage portion 2 and an outer shape can be thus maintained) after injection-molded in the injection molding part 10 is pulled out (demolded) with being held on the neck mold 50 from the injection core mold 11 and the injection cavity mold 12, and is conveyed to the temperature adjustment part 20 as the rotation plate is rotated in the counterclockwise direction by 90 degrees as shown in FIG. 1. Since the preform 1 is demolded from the injection molding part 10 at a higher temperature than the conventional art, the outer layer (skin layer) of the storage portion 2 is formed thin but the inner layer (core layer) is formed thick, so that the residual heat higher than that of the conventional art is maintained.

The temperature adjustment part 20 is arranged next to the injection molding part 10, and includes a temperature adjustment cavity mold 22 and one of a temperature adjustment core mold 21 or an air introduction/discharge member 61, as shown in FIGS. 3 and 4.

The preform 1 conveyed from the injection molding part 10 is moved down together with the rotation plate until the neck mold 50 comes in contact with a centering ring 60 attached on the temperature adjustment cavity mold 22, and is inserted into the temperature adjustment cavity mold 22. When the preform 1 is inserted in the temperature adjustment cavity mold 22, the temperature adjustment core mold 21 or the air introduction/discharge member 61 is inserted into the preform 1 through an upper opening formed on the neck portion 3 of the preform 1. Note that, in a case of using the temperature adjustment core mold 21, the preform 1 may be inserted into the temperature adjustment cavity mold 22 together with the temperature adjustment core mold 21 after the temperature adjustment core mold 21 is inserted into the preform 1.

The temperature adjustment core mold 21 and the temperature adjustment cavity mold 22 are cooled to equal to or higher than 10° C. and equal to or lower than 90° C., and preferably equal to or higher than 60° C. and equal to or lower than 90° C. as a coolant (temperature adjustment medium) flows through a flow path formed therein. The air introduction/discharge member 61 is configured to cause a compressed air for cooling of a predetermined temperature to flow in the storage portion 2. The preform 1 conveyed to the temperature adjustment part 20 is too high in temperature for blow molding, and also has temperature unevenness that has not been completely eliminated during cooling. By bringing the inner and outer surfaces of the storage portion 2 into contact with the temperature adjustment core mold 21 and the temperature adjustment cavity mold 22 or by bringing the outer surface into contact with the temperature adjustment cavity mold 22 and blowing out the air from the air introduction/discharge member 61 to the inner surface, the preform is cooled and is temperature-adjusted to a temperature suitable for blow molding.

FIG. 3 shows an example where the storage portion 2 of the preform 1 is cooled by the temperature adjustment cavity mold 22 and the temperature adjustment core mold 21. The temperature adjustment core mold 21 is formed with a narrowed portion 23a so as to prevent contact with the neck portion 3 when inserting the temperature adjustment core mold 21 into the temperature adjustment cavity mold 22.

The temperature adjustment core mold 21 of the present embodiment has a tapered shape of an angle smaller than the tapered injection core mold 11 of the injection molding part 10. Thereby, it is possible to compression-deform the preform 1 from a shape that can be easily removed (demolded) or molded from the injection molding part 10 into a desired shape that can be easily blow-molded.

As shown in FIG. 3, the temperature adjustment part 20 is provided so that the temperature adjustment core mold 21 contacts and presses the substantially entire inner surface of the storage portion 2 of the preform 1 and the temperature adjustment cavity mold 22 contacts and presses the substantially entire outer surface of the storage portion 2 of the preform 1. Thereby, even when the preform 1 is irregularly shrinkage-deformed after being demolded from the injection molding part 10, the preform 1 can be cooled and the shape thereof can be corrected while sandwiching the storage portion 2 of the preform 1 between the temperature adjustment core mold 21 and the temperature adjustment cavity mold 22. Here, the inside and outside of the preform 1 may be temperature-adjusted at the same time while forcibly compression-deforming the preform 1 having a primary shape during injection molding into the preform 1 having a secondary shape suitable for blow molding into a final container 1a by cooling the preform 1 while pressurizing and sandwiching the preform 1 with the temperature adjustment core mold 21 and the temperature adjustment cavity mold 22.

FIG. 4 shows an example where the storage portion 2 of the preform 1 is cooled by the temperature adjustment cavity mold 22 and the air introduction/discharge member 61. In FIG. 4, the air introduction/discharge member 61 includes a hollow rod member 62 having an air flowing hole provided therein, and a fitting core (a blow core member for temperature adjustment) 63. The rod member 62 is accommodated to be movable up and down in the fitting core 63. A tip end of the rod member 62 is provided with an inner flowing port 62a through which air can be jetted or sucked. A temperature of the air is set as appropriate within a range of about 0° C. to about 20° C. (room temperature), according to a thickness of the preform 1 or the container 1a. The fitting core 63 is configured to be fitted to (brought into close contact with) the neck portion 3 when the air introduction/discharge member 61 is inserted into (brought into contact in an airtight manner with) the preform 1. Thereby, it is possible to prevent the air in the preform 1 from leaking from the neck portion 3 toward an outer side of the fitting core 63. A gap between the rod member 62 and the fitting core 63 is an air flowing path for supplying/discharging the air with respect to the preform 1. A gap formed by a tip end of the fitting core 63 and the rod member 62 constitutes a first outer flowing port 64 through which the air can be ejected or sucked. The inner flowing port 62a and the outer flowing port 64 can serve as a blowing port and a discharge port, respectively.

As an operation, in FIG. 4, the preform 1 is first accommodated in a preform-shaped space of the temperature adjustment cavity mold 22. Then, the air introduction/discharge member 61 is inserted into (brought into contact in an air-tight manner with) the preform 1 accommodated in the cavity mold 22. Then, in a state where the first inner flowing port 62a is closed, preliminary blow of blowing the air from the outer flowing port 64 of the air introduction/discharge member 61 into the preform 1 to bring the storage portion 2 of the preform 1 into close contact with an inner wall of the cavity mold 22 is performed. Subsequently, cooling blow of introducing air from the inner flowing port 62a by opening the inner flowing port 62a and discharging the air to an outside of the preform 1 through the outer flowing port 64 is performed. In this way, in the preliminary blow and the cooling blow, it is preferable to set the flowing directions of the air in opposite directions. At this time, since the air is continuously jetted from the inner flowing port 62a, the preform 1 is cooled from the inner side by convection of the air flowing in the preform 1. Further, since the preform 1 is in continuous contact with the cavity mold 22, the preform is temperature-adjusted so as not to be equal to or lower than a temperature suitable for blow molding from the outer side, and the temperature unevenness caused during the injection molding is also reduced. Note that, since the cavity mold 22 has the preform-shaped space, the shape of the preform 1 does not largely change. After the cooling for a predetermined time, the cooled preform 1 is moved to the blow molding part 30.

Note that, the air flowing direction of the air introduction/discharge member 61 can be changed as appropriate. For example, as shown in FIG. 4, during the cooling blow, the air may be sent from the outer flowing port 64, may pass an inside of the rod member 62 from the inner flowing port 62a and may be then discharged. At this time, during the preliminary blow, the air is preferably sent from the inner flowing port 62a into the preform 1, in a state where the outer flowing port 64 is closed. In a case where it is intended to increase a cooling intensity on the lower side (the bottom-side of the storage portion 2) of the preform 1, the air is caused to flow from the inner flowing port 62a toward the outer flowing port 64. In a case where it is intended to increase a cooling intensity on the upper side (the upper side of the storage portion 2) of the preform 1, the air is caused to flow from the outer flowing port 64 toward the inner flowing port 62a. Note that, for example, in a case where it is intended to intensively cool a specific part of the preform 1 to thereby increase a thickness of a specific part of the container 1a, the blowing directions of the air during the preliminary blow and the cooling blow may be set to be the same.

If the PET material is slowly cooled to a temperature range of about 120° C. to 200° C., whitening or cloudiness is caused due to crystallization. Therefore, in order to manufacture the highly clear container 1a (refer to FIG. 5) from the preform 1 demolded in a high-temperature state from the injection molding part 10, it is necessary to quickly cool the preform 1 to a crystallization temperature range or lower. At this time, in a case of the preform 1 having a thick wall portion 5 (the storage portion 2, especially, the body portion 2a), it was difficult to sufficiently cool a center of the wall portion 5 in the conventional art. However, according to the temperature adjusting method shown in FIG. 3 or 4, even when the wall portion 5 of the preform 1 is thick, it is possible to significantly improve the efficiency of the temperature unevenness removing, the temperature uniformizing and the cooling. In addition, since the temperature distribution suitable for blow molding as a whole is obtained, it is possible to prevent unevenness of the thickness of the container 1a, which is a final form. Note that, the wall portion 5 of the preform 1 includes a first wall portion corresponding to the body portion formed into a substantially cylindrical shape and connected to the neck portion 3 and a second wall portion corresponding to the bottom portion having a closed region and connected to the body portion.

The preform 1 temperature-adjusted in the temperature adjustment part 20 is pulled out from the temperature adjustment cavity mold 22 with being held by the neck mold 50, and is conveyed to the blow molding part 30 as the rotation plate is further rotated in the counterclockwise direction by 90 degrees as shown in FIG. 1.

As shown in FIG. 1, the blow molding part 30 is arranged next to the temperature adjustment part 20, and has a blow mold 31 and an air blowing portion (not shown).

A mold surface, which corresponds to a shape of the container 1a, is formed on an inner side of the blow mold 31, and the blow mold 31 much larger than the temperature adjustment cavity mold 22 of the temperature adjustment part 20.

The air blowing portion is provided so as to fill the air in the preform 1 inserted in the blow mold 31.

When the preform 1 conveyed to the blow molding part 30 is inserted into the blow mold 31, the air blowing portion is connected to an opening of the neck portion 3 of the preform 1 and the air is blown from the air blowing portion into the preform 1, the storage portion 2 of the preform 1 is inflated until the entire outer surface of the storage portion 2 comes into close contact with and is pressed to the mold surface of the blow mold 31, as shown in FIG. 5, so that the container 1a is molded.

The preform 1 (container 1a) blow-molded in the blow molding part 30 is pulled out from the blow mold 31 with being held by the neck mold 50, and is conveyed to the take-out part 40 as the rotation plate is further rotated in the counterclockwise direction by 90 degrees, as shown in FIG. 1.

As shown in FIG. 1, the take-out part 40 is arranged between the blow molding part 30 and the injection molding part 10. In the take-out part 40, the neck mold 50 is opened, so that the container 1a is not held any more. As a result, the container 1a is dropped, so that the container 1a is taken out from the blow molding apparatus 100.

In the blow molding apparatus 100 of the present embodiment, the preform 1 is demolded from the injection cavity mold 12 in the high-temperature state in which the preform 1 is cooled only to such a degree that the outer shape thereof can be maintained. Specifically, before an outer surface temperature (a temperature of a surface layer of an outer peripheral surface of the body portion 2a) of the body portion 2a of the preform 1 demolded from the injection molding part 10 becomes higher than an inner surface temperature (a temperature of a surface layer on an inner peripheral surface of the body portion 2a) of the body portion 2a, for example, at a temperature at which the outer surface temperature is higher than the glass transition temperature of the preform 1 by equal to or higher than 30° C. and equal to or lower than 60° C., the preform 1 is inserted (carried) into the temperature adjustment part 20. The temperature adjustment part 20 is configured to cool the inner layer via the inner and outer surface layers so as to lower the outer surface temperature by equal to or higher than 10° C. and equal to or lower than 50° C. from the outer surface temperature at a time when the preform 1 is inserted (carried) into the temperature adjustment part 20. Note that, the glass transition temperature of the preform 1 made of PET is about 75° C., for example.

Usually, the preform 1 molded with sufficient time in the injection molding part 10 tends to strongly contact the injection core mold 11 by shrinkage of the resin and to separate from the injection cavity mold 12, so that the outer surface temperature of the preform 1 is higher than the inner surface temperature at a time when the preform is conveyed to the temperature adjustment part. Further, a temperature gradient (heat gradient) between the inner layer and the outer layer of the preform 1 is relatively small. On the other hand, the blow molding apparatus 100 of the present embodiment is configured so that the preform 1 is conveyed to the temperature adjustment part 20 at a much higher temperature as compared to that of the conventional art. Since the preform 1 is demolded from the injection core mold 11 and the injection cavity mold 12 in the injection molding part 10 in a state where the residual heat of the inner layer is higher than that of the conventional art, the temperature gradient between the inner layer and the outer layer becomes greater than that of the conventional art. Therefore, heat exchange by the heat transfer between the inner layer and the outer layer of the preform 1 is actively performed. Thereby, during the conveying to the temperature adjustment part 20, the outer surface temperature of the preform 1 is once increased by return heat (transfer of heat from the inner layer to the outer layer), so that the temperature difference between the inner and outer layers is significantly reduced and the temperature uniformizing and the temperature unevenness removing are promoted using the short conveying time between the injection molding part 10 and the temperature adjustment part 20 (a mold opening/closing operation time of the injection molding part 10 and a conveying time from the injection molding part 10 to the temperature adjustment part 20). Specifically, the high-temperature demolding promotes the transfer of heat to such a degree that the temperature of the outer layer (skin layer) of the preform 1 rapidly rises from a temperature (for example, 5.0° C. to 20.0° C.) close to the injection mold to a temperature of equal to or higher than 110° C. and equal to or lower than 130° C. during the conveying time (for example, 4.0 seconds to 12.0 seconds, more preferably 4.0 seconds to 8.0 seconds), thereby improving the effects of uniformizing the temperature and removing the temperature unevenness of the preform 1. At the same time, during the conveying time, the preform 1 is cooled and the extra heat of the preform 1 generated by the high-temperature demolding is discharged to the outside air, so that the cooling time of the inner layer required in the temperature adjustment part 20 is shortened. Accordingly, the cooling efficiency of the inner layer and the temperature adjusting efficiency of the inner and outer layers of the preform 1 in the temperature adjustment part 20 are improved. As a result, it is possible to lower the temperature of the preform to a temperature lower than the crystallization temperature range in a short time, to adjust the preform to a temperature distribution state suitable for stretch orientation in a short time, and therefore, to manufacture a container having high transparency and physical properties in a short time. Further, the preform 1 is demolded at high temperatures in the injection molding part 10, so that the outer layer of the preform 1 is put to high temperatures and softened before the next process. Therefore, the roughness originating from the injection core mold or injection cavity mold transferred to the surface layer of the preform 1 can be reduced or eliminated. Accordingly, the roughness of the surface layer of the preform 1 immediately before the blow molding can be reduced, as compared to the conventional art, so that the container 1a whose surface roughness is small and surface gloss is high can be manufactured.

In the temperature adjustment part 20, the temperature is adjusted (cooled) so as to be inversely proportional to the thickness of the wall portion 5 (more specifically, the body portion 2a), and at least the outer surface temperature of the preform 1 is adjusted to be within a predetermined temperature range. The inner surface temperature may also be adjusted to be within a predetermined temperature range. For example, the temperature of the preform 1 is adjusted (cooled) in the temperature adjustment part 20 so that in a case where the thickness of the wall portion 5 is equal to or greater than 1.5 mm and equal to or smaller than 3.0 mm, the outer surface temperature is equal to or higher than 87° C. and equal to or lower than 93° C., and in a case where the thickness of the wall portion 5 is equal to or greater than 3.0 mm and equal to or smaller than 5.0 mm, the outer surface temperature is equal to or higher than 77° C. and equal to or lower than 83° C. That is, for the preform 1 whose wall portion 5 is thicker, the temperature is further lowered during temperature adjustment in the temperature adjustment part 20. The temperature of the preform 1 before blow molding is further lowered as compared to conventional art according to the thickness of the wall portion 5 of the preform 1, so that favorable orientation stretch is generated during blow molding and a container having high transparency and physical properties can be thus manufactured.

For example, when the preform 1 mainly made of a thermoplastic resin (for example, PET) whose glass transition temperature is equal to or higher than 50° C. and equal to or lower than 150° C. and thickness is equal to or greater than 1.5 mm and equal to or smaller than 4.0 mm, more preferably, equal to or greater than 1.5 mm and equal to or smaller than 3.5 mm is used, the preform 1 is inserted into the temperature adjustment cavity mold 22 of the temperature adjustment part 20 in a state where the outer surface temperature of the preform 1 is equal to or higher than 110° C. and equal to or lower than 150° C., more preferably, equal to or higher than 100° C. and equal to or lower than 135° C.

Also, when the preform 1 mainly made of a thermoplastic resin (for example, PET) whose glass transition temperature is equal to or higher than 50° C. and equal to or lower than 150° C. and thickness is equal to or greater than 3.0 mm and equal to or smaller than 10.0 mm, more preferably, equal to or greater than 3.5 mm and equal to or smaller than 7.0 mm is used, the preform 1 is inserted into the temperature adjustment cavity mold 22 of the temperature adjustment part 20 in a state where the outer surface temperature of the preform 1 is equal to or higher than 100° C. and equal to or lower than 140° C., more preferably, equal to or higher than 85° C. and equal to or lower than 130° C.

At this time, a molding time of the preform 1 in the injection molding part 10, i.e., a time for which the neck mold 50 stands by (stops) in the injection molding part 10 is set short to shorten the cooling time in the injection molding part 10, and a deficient amount of cooling time is secured in the temperature adjustment part 20. For example, when manufacturing the container 1a by using the preform 1 made of PET and having a thickness of 2.85 mm, a cycle time for one cycle consisting of a series of processes from the injection molding in the injection molding part 10 to the take-out of the container 1a in the take-out part 40 is about 5.0 seconds to about 10.0 seconds, i.e., the treatment time of each process is about 10.0 seconds or shorter, and when manufacturing the container 1a by using the preform 1 made of PET and having a thickness of 3.85 mm, the cycle time is about 10.0 seconds to about 16.4 second, i.e., the treatment time of each process is about 16.4 seconds or shorter.

Hereinafter, the temperature adjustment of the preform 1 injection-molded in the injection molding part 10, which is performed in the temperature adjustment part 20, is specifically described.

Figure 6A:
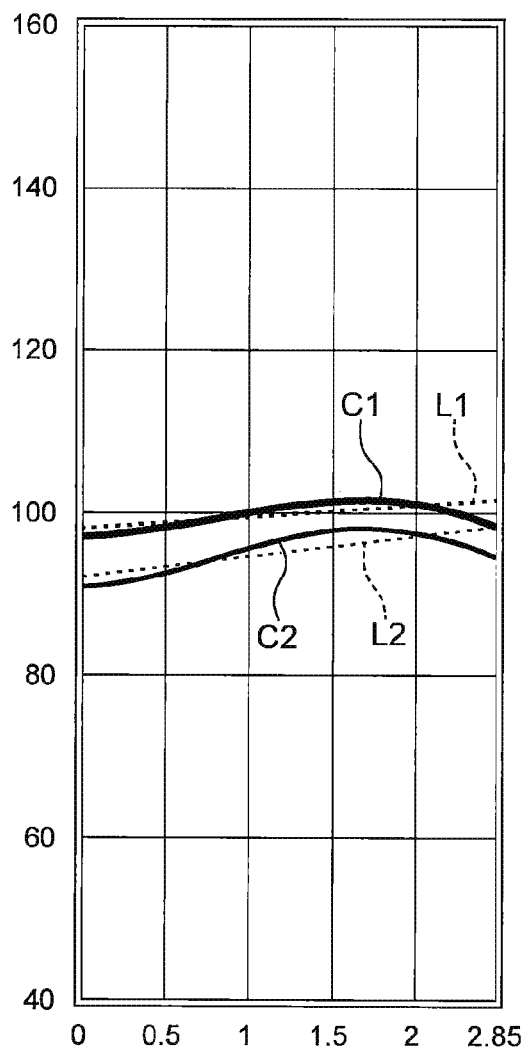
FIGS. 6(a) and 6(b) are graphs of a temperature distribution when a temperature of a preform having a thickness of 2.85 mm is adjusted.
Figure 6B:
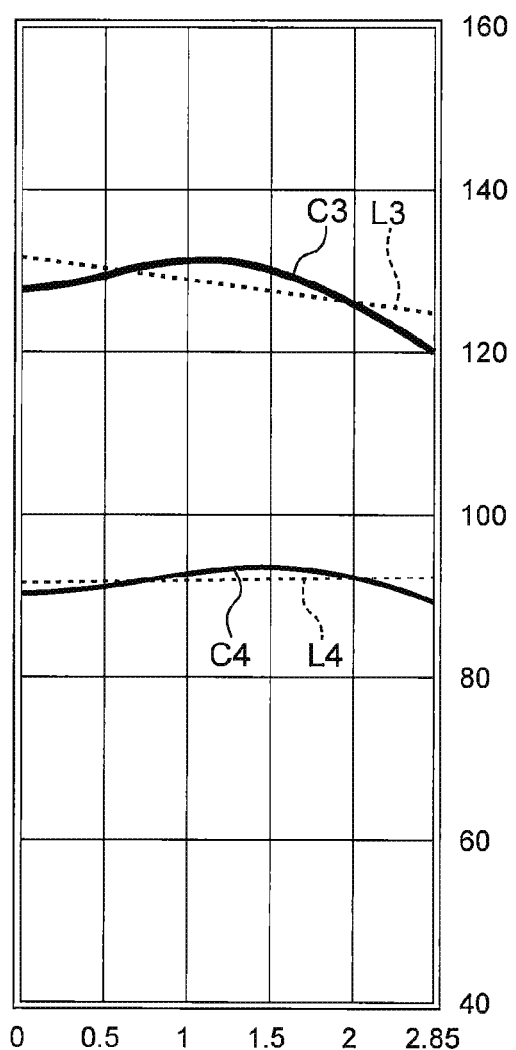
Figure 7:
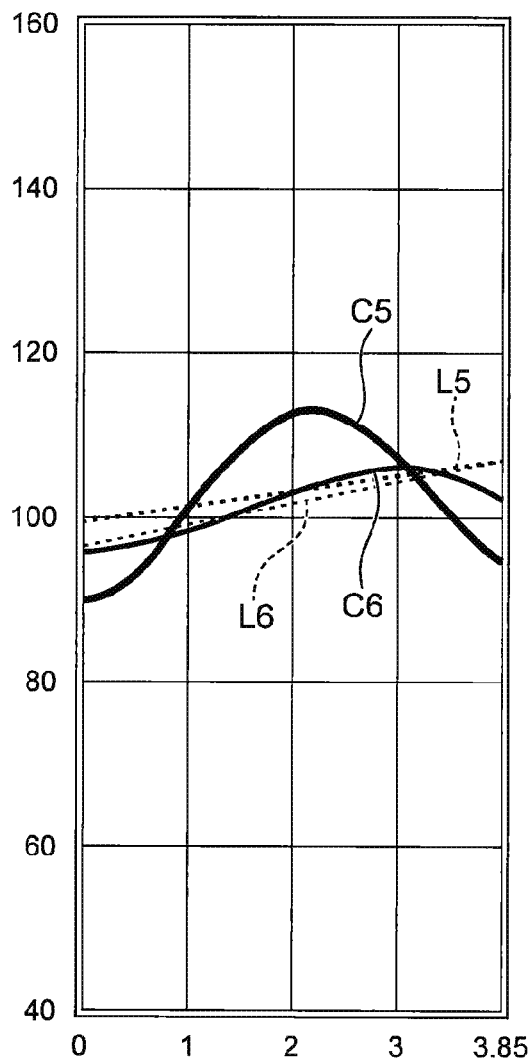
FIGS. 7(a) and 7(b) are graphs of a temperature distribution when a temperature of a preform having a thickness of 3.85 mm is adjusted.
Figure 7:
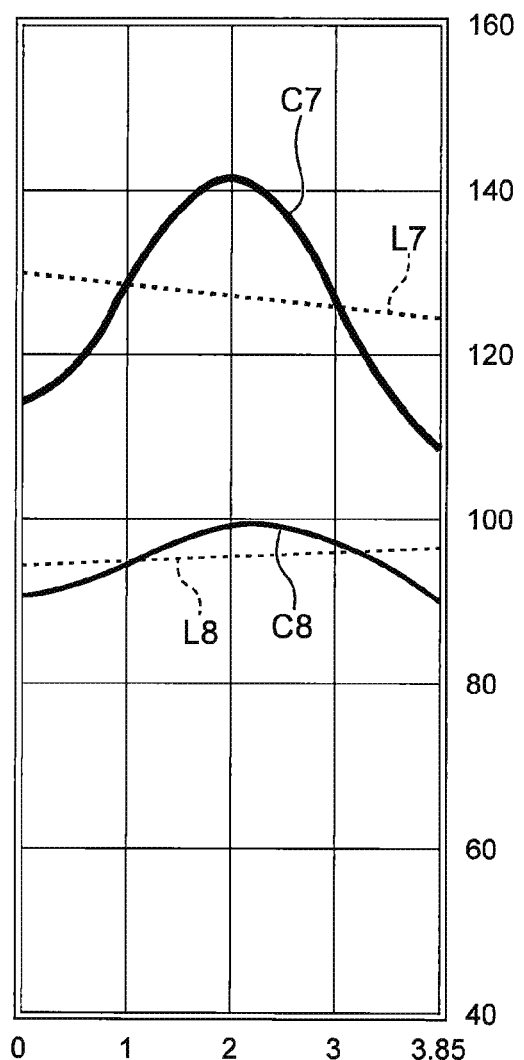

FIG. 6 shows a graph of a temperature distribution obtained when the preform whose wall portion 5 (body portion 2a) has a thickness of 1.0 mm to 4.0 mm (more preferably, 1.5 mm to 3.5 mm), specifically 2.85 mm, was temperature-adjusted, and FIG. 7 shows a graph of a temperature distribution obtained when the preform whose wall portion 5 (body portion 2a) has a thickness of 3.0 mm to 10.0 mm (more preferably, 3.5 mm to 7.0 mm), specifically 3.85 mm, was temperature-adjusted. (a) of FIG. 6 and (a) of FIG. 7 show graphs obtained when the preforms were temperature-adjusted according to the conventional art, and (b) of FIG. 6 and (b) of FIG. 7 show graphs obtained when the preforms were temperature-adjusted according to the present embodiment.

In (a) of FIG. 6, the horizontal axis indicates positions in the thickness direction, the vertical axis indicates temperatures, a temperature distribution curve C1 indicates a temperature distribution before temperature adjustment, a temperature distribution curve C2 indicates a temperature distribution after temperature adjustment, a line L1 indicates an approximate line of the temperature distribution curve C1, and a line L2 indicates an approximate line of the temperature distribution curve C2. In (b) of FIG. 6, the horizontal axis indicates positions in the thickness direction, the vertical axis indicates temperatures, a temperature distribution curve C3 indicates a temperature distribution before temperature adjustment, a temperature distribution curve C4 indicates a temperature distribution after temperature adjustment, a line L3 indicates an approximate line of the temperature distribution curve C3, and a line L4 indicates an approximate line of the temperature distribution curve C4. In (a) of FIG. 7, the horizontal axis indicates positions in the thickness direction, the vertical axis indicates temperatures, a temperature distribution curve C5 indicates a temperature distribution before temperature adjustment, a temperature distribution curve C6 indicates a temperature distribution after temperature adjustment, a line L5 indicates an approximate line of the temperature distribution curve C5, and a line L6 indicates an approximate line of the temperature distribution curve C6. In (b) of FIG. 7, the horizontal axis indicates positions in the thickness direction, the vertical axis indicates temperatures, a temperature distribution curve C7 indicates a temperature distribution before temperature adjustment, a temperature distribution curve C8 indicates a temperature distribution after temperature adjustment, a line L7 indicates an approximate line of the temperature distribution curve C7, and a line L8 indicates an approximate line of the temperature distribution curve C8. Note that, the temperatures of the temperature distribution curves C1 to C8 each indicate average temperatures of the wall portion 5 (more specifically, the body portion 2a) in the thickness positions.

When adjusting the temperature of the preform 1 having the thickness of 2.85 mm according to the conventional art, since it is necessary to sufficiently cool the injection molded preform 1 in advance in the injection molding part 10, the time necessary for the injection molding process, i.e., the time for which the neck mold stands by in the injection molding part is set to about 12.9 seconds or shorter (in a case where the machine operating time (conveying time) for the mold opening/closing operation of the injection molding part 10 and the conveying of the preform 1 is about 4.0 seconds, the injection molding time of the preform 1 is about 8.9 seconds. Also in following examples, it is assumed that the machine operating time is about 4.0 seconds.).

The preform 1 is conveyed to the temperature adjustment part after it is sufficiently cooled in the injection molding part, and as shown in (a) of FIG. 6, in the case of the temperature distribution curve C1 at a time when the preform is conveyed to the temperature adjustment part, the outer surface temperature is higher than the inner surface temperature. At this time, the line L1 is inclined in the right upper direction from the inner side toward the outer side of the preform 1 so that the outer surface temperature is the highest, and the outer surface temperature is about 99° C. (the average temperature of the body portion 2*a* is about 98° C.).

Also in the case of the temperature distribution curve C2 after temperature adjustment in the temperature adjustment part (temperature adjustment treatment (heating treatment) for eliminating the temperature unevenness, uniformizing the temperatures and suppressing decrease in temperature without performing the cooling), the outer surface temperature is higher than the inner surface temperature. At this time, the line L2 is inclined in the right upper direction from the inner side toward the outer side of the preform 1 so that the outer surface temperature is the highest, and the outer surface temperature is about 95° C. (the average temperature of the body portion 2*a* is about 93° C.).

On the other hand, when performing temperature adjustment by the temperature adjustment part 20 according to the present embodiment, since the injection molded preform 1 is cooled only a little in the injection molding part, the time required for the injection molding process, i.e., the time for which the neck mold 50 stands by in the injection molding part 10 is merely about 10.0 seconds or shorter (the injection molding time of the preform 1 is about 6.0 seconds, which is a sum of injection time of about 4.0 seconds and cooling time of about 2.0 seconds).

The preform 1 is conveyed to the temperature adjustment part 20 after being cooled only a little in the injection molding part, and as shown in (b) of FIG. 6, in the case of the temperature distribution curve C3 at a time when the preform is conveyed to the temperature adjustment part 20, the outer surface temperature is lower than the inner surface temperature. At this time, the line L3 is inclined in the right lower direction from the inner side toward the outer side of the preform 1 so that the outer surface temperature is the lowest, and the outer surface temperature is about 120° C. (a temperature range of 100° C. to 135° C. (the average temperature of the body portion 2*a* is about 125° C.)).

In the case of the temperature distribution curve C4 after the preform is cooled in the temperature adjustment part 20, the outer surface temperature is substantially the same as the inner surface temperature in height. At this time, the line L4 is inclined in the right upper direction from the inner side toward the outer side of the preform 1 so that the outer surface temperature is the highest, and the outer surface temperature is about 90° C. (a temperature range of 85° C. to 105° C. (the average temperature of the body portion 2*a* is about 90° C.)).

According to the blow molding apparatus 100 of the present embodiment, the temperature has a form of substantially decreasing from the inner side toward the outer side in the thickness direction of the wall portion 5 (body portion 2*a*) of the preform 1 at a time when the preform is conveyed to the temperature adjustment part 20.

On the other hand, the preform 1 cooled in the temperature adjustment part 20 is in a state where the inner layer is cooled via the inner and outer surface layers so that the outer surface temperature is lowered by 15° C. or more from the temperature at a time when the preform is inserted (conveyed) into the temperature adjustment part 20 and the temperature substantially rises from the inner side toward the outer side in the thickness direction of the wall portion 5 (body portion 2*a*) of the sufficiently cooled preform 1. As can be seen from the above, the temperature adjustment part 20 is set so that the cooling intensity of the inner surface of the preform 1 is higher than the cooling intensity of the outer surface.

Subsequently, the temperature adjustment of the preform having a thickness of 3.85 mm is described with reference to FIG. 7.

When adjusting the temperature of the preform having a thickness of 3.85 mm according to the conventional art, it is necessary to sufficiently cool the injection-molded preform 1 in the injection molding part, similar to the case where the preform 1 having the thickness of 2.85 mm is used. Therefore, the time required for the injection molding process, i.e., the time for which the neck mold stands by in the injection molding part is set to about 20.9 seconds or shorter (the injection molding time of the preform 1 is about 14.9 seconds).

The preform 1 is conveyed to the temperature adjustment part after it is sufficiently cooled in the injection molding part, and as shown in (a) of FIG. 7, in the case of the temperature distribution curve C5 at a time when the preform is conveyed to the temperature adjustment part, the outer surface temperature is higher than the inner surface temperature. At this time, the line L5 is inclined in the right upper direction from the inner side toward the outer side of the preform 1 so that the outer surface temperature is the highest, and the outer surface temperature is about 94° C. (the average temperature of the body portion 2*a* is about 102° C.).

Also in the case of the temperature distribution curve C6 after the preform is temperature-adjusted (heating-treated) in the temperature adjustment part, the outer surface temperature is higher than the inner surface temperature. At this time, the line L6 is inclined in the right upper direction from the inner side toward the outer side of the preform 1 so that the outer surface temperature is the highest, and the outer surface temperature is about 103° C. (the average temperature of the body portion 2*a* is about 100° C.).

On the other hand, when performing temperature adjustment by the temperature adjustment part 20 according to the present embodiment, since the injection molded preform 1 is cooled only a little in the injection molding part 10, the time required for the injection molding process, i.e., the time for which the neck mold 50 stands by in the injection molding part 10 is merely about 16.4 seconds or shorter (the injection molding time of the preform 1 is about 12.9 seconds).

The preform 1 is conveyed to the temperature adjustment part 20 after being cooled only a little in the injection molding part 10, and as shown in (b) of FIG. 7, in the case of the temperature distribution curve C7 at a time when the preform is conveyed to the temperature adjustment part 20, the outer surface temperature is lower than the inner surface temperature. At this time, the line L7 is inclined in the right lower direction from the inner side toward the outer side of the preform 1 so that the outer surface temperature is the lowest, and the outer surface temperature is about 115° C. (a temperature range of 85° C. to 130° C. (the average temperature of the body portion 2*a* is about 126° C.)).

In the case of the temperature distribution curve C8 after the preform is cooled in the temperature adjustment part 20, the outer surface temperature is substantially the same as the inner surface temperature in height. At this time, the line L8 is inclined in the right upper direction from the inner side toward the outer side of the preform 1 so that the outer surface temperature is the highest, and the outer surface temperature is about 90° C. (a temperature range of 75° C. to 100° C. (the average temperature of the body portion 2*a* is about 94° C.)).

By the above, the temperature has a form of substantially decreasing from the inner side toward the outer side in the thickness direction of the wall portion 5 (body portion 2a) of the preform 1 at a time when conveyed to the temperature adjustment part 20.

On the other hand, the preform 1 cooled in the temperature adjustment part 20 is in a state where the inner layer is cooled via the inner and outer surface layers so that the outer surface temperature is lowered by 15° C. or more from the outer surface temperature at a time when the preform is inserted (conveyed) into the temperature adjustment part 20 and the temperature substantially rises from the inner side toward the outer side in the thickness direction of the wall portion 5 (body portion 2a) of the sufficiently cooled preform 1.

According to the blow molding apparatus 100 of the present embodiment, the preform 1 is inserted into the temperature adjustment part 20 before the outer surface temperature of the preform 1 molded in the injection molding part 10 becomes higher than the inner surface temperature of the preform 1 molded in the injection molding part 10, and in the temperature adjustment part 20, the preform 1 is cooled at the inner and outer sides at the same time so that at least the outer surface temperature of the preform 1 is lowered within the range of 10° C. to 50° C. as compared to the outer surface temperature of the preform 1 when the preform 1 is conveyed to the temperature adjustment part 20. Thereby, the injection molding process can be performed in a short time, so that the molding cycle time is shortened and the preform is sufficiently cooled in the temperature adjustment part 20. Therefore, it is possible to manufacture a container having a favorable quality even by the hot parison type blow molding method.

In addition, as shown in FIGS. 6 and 7, the temperature of the preform 1 conveyed to the blow molding part 30, i.e., the temperature of the preform 1 immediately before the blow molding is set lower than the conventional method. Thereby, during the blow molding, it is possible to orient and stretch (substantially uniform biaxial stretch) the preform more favorably than the conventional method, so that it is possible to improve transparency and physical properties of a container to be manufactured. In addition, it is possible to reduce molding defects (appearance defects) of the container, such as fish eyes (tears pattern), ring patterns (stretch unevenness) and orange peel (surface roughness in a pear-skin state).

As described above, in the four-station type embodiment shown in FIG. 1, the temperatures between the inner and outer layers of the preform are uniformized (hereinafter, referred to as 'first temperature uniformizing') using the time for which the preform 1 is conveyed from the injection molding part 10 to the temperature adjustment part 20. However, the preform 1 may be further subjected to second temperature uniformizing by using the conveying time from the temperature adjustment part 20 to the blow molding part 30. This is described in detail.

Figure 8:
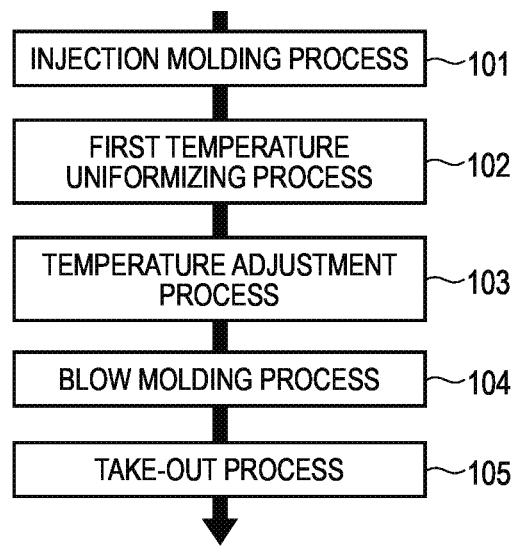
FIG. 8 is a flowchart of an entire process including a first temperature uniformizing process of the preform.

First, the first temperature uniformizing process is again described by a flowchart of FIG. 8. In FIG. 8, an injection molding process 101, a temperature adjustment process 103, a blow molding process 104 and a container take-out process 105 of a four-station type are continuously provided so as to finally obtain a container from a preform. However, a first temperature uniformizing process 102 is provided between the injection molding process 101 and the temperature adjustment process 103. Thereby, as described above, the temperature difference between the inner and outer layers of the preform is significantly reduced using the short preform conveying time (conveying time) between the injection molding process 101 and the temperature adjustment process 103, so that the temperature distribution between the inner and outer layers is uniformized. Therefore, it is possible to efficiently perform the temperature adjustment operation in the temperature adjustment process 103.

Figure 9:
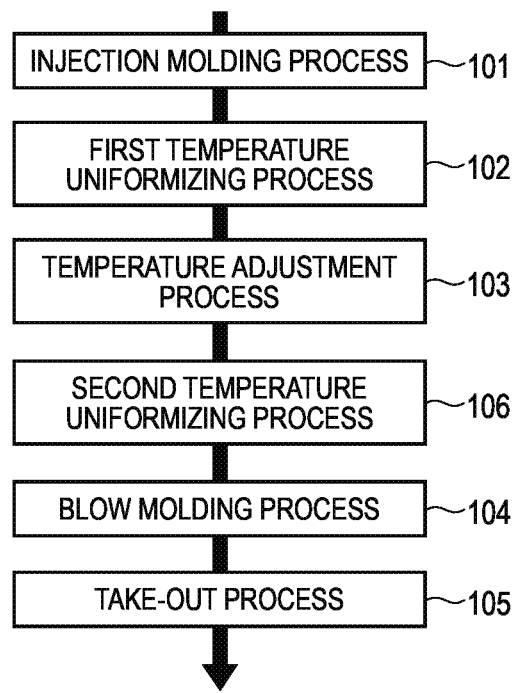
FIG. 9 is a flowchart of an entire process including the first temperature uniformizing process and a second temperature uniformizing process of the preform.

Subsequently, the second temperature uniformizing process is described by a flowchart of FIG. 9. In FIG. 9, the same parts as FIG. 8 are denoted with the same reference signs, and the descriptions thereof are omitted. According to this, in addition to the first temperature uniformizing process, a second temperature uniformizing process 106 is further provided between the temperature adjustment process 103 and the blow molding process 104. The reason is described.

When temperature-adjusting/cooling the preform in the temperature adjustment process 103, a portion (wall portion 5) which corresponds to a parting line (air vent) between adjacent stages of a multistage temperature adjustment cavity mold (having a shape where the temperature adjustment cavity mold 22 shown in FIG. 4 is divided into a plurality of stages and overlapped in the upper and lower direction) contacts an air layer thereof and becomes a low temperature, and in a cooling blow method, the preform 1 becomes locally a low temperature by a contact method (supply method) of the cooling air to the preform 1 during the temperature adjustment process (temperature uniformizing becomes insufficient and temperature unevenness remains). Thereby, during the subsequent blow molding process, the molding defect (appearance defect) of the container, for example, a ring pattern, a tears pattern and the like may be generated on the surface of the container. In addition, even when each member of the temperature adjustment process 103 is optimally adjusted, the temperature unevenness of the preform 1 cannot be completely eliminated in many cases, and it may be desired to finely adjust the temperature distribution of the preform 1 even after the temperature adjustment process 103. However, by causing the preform 1 whose temperature has been adjusted in the second temperature uniformizing process 106 to be left alone (to stand by) for a predetermined time, for example, for 2 to 4 seconds immediately before the blow molding, the local low-temperature state of the preform 1 is relieved, so that the overall temperature uniformizing is progressed and generation of the molding defects is prevented. Further, during the second temperature uniformizing process 106, the temperature distribution of the preform 1 can be naturally finely adjusted to eliminate the temperature unevenness by using the remaining heat of the preform 1 originating from the injection molding process 101 and the natural cooling. Therefore, as compared to a case where the second temperature uniformizing process 106 is not provided, it is possible to mold a container having better appearance, thickness distribution and physical properties.

Further, while the first temperature uniformizing process 102 is performed using only the conveying time from the injection molding part 101 to the temperature adjustment part 20, the second temperature uniformizing process 106 is actually performed using a time obtained by summing the conveying time from the temperature adjustment part 20 to the blow molding part 30 and a delay time (standby time) of a mold closing operation of the blow mold 31. Specifically, while the preform 1 is left alone (made to stand by) between a pair of blow split molds in an open state of the blow mold 31, the subsequent injection molding and temperature adjustment process of the preform (for the later molding cycle) are performed in parallel. Thereby, the extension of the cycle time due to the second temperature uniformizing is minimized, which is efficient in time. Therefore, it is preferable to set the time of the second temperature uniformizing longer than the time of the first temperature uniformizing.

Also, depending on cases, only the first temperature uniformizing process or only the second temperature uniformizing process may be adopted.

Second Embodiment

Figure 10:
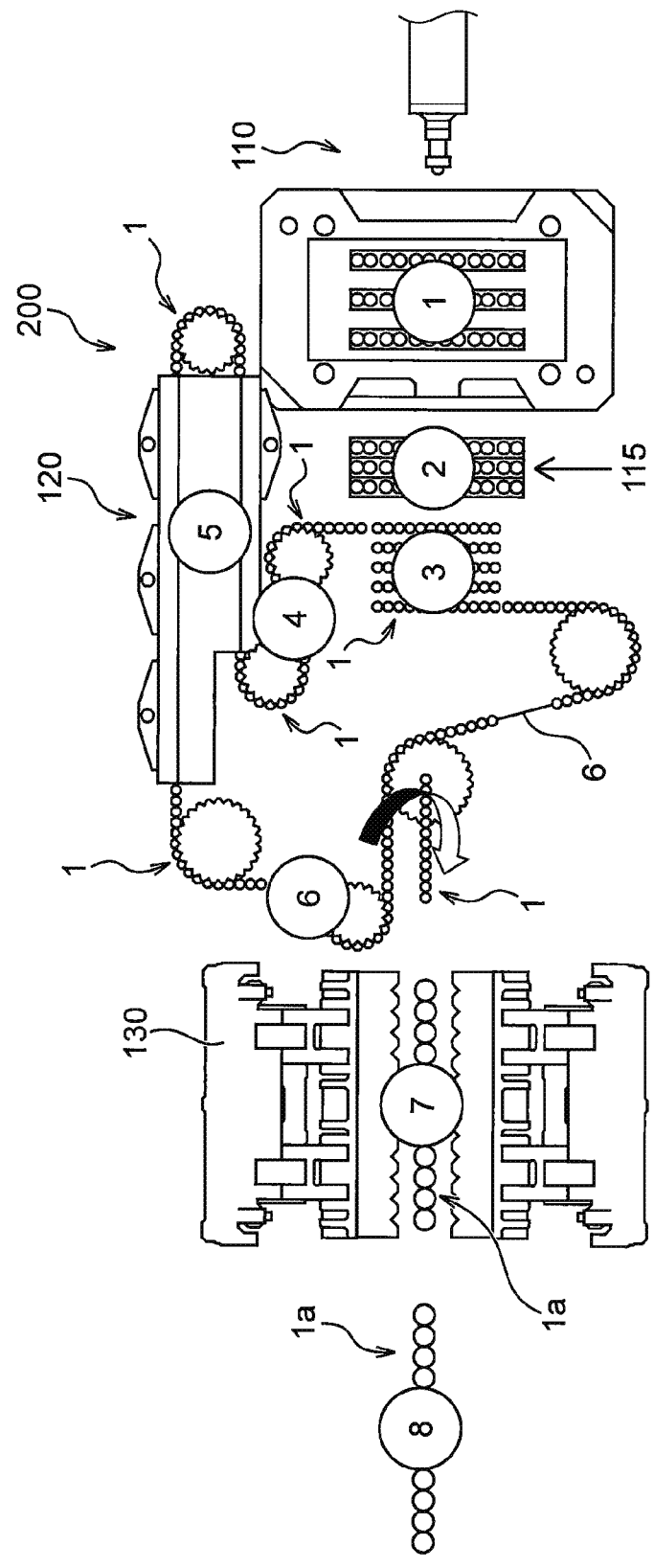
FIG. 10 is a schematic view of a blow molding apparatus according to a second embodiment of the present invention.
Figure 11:
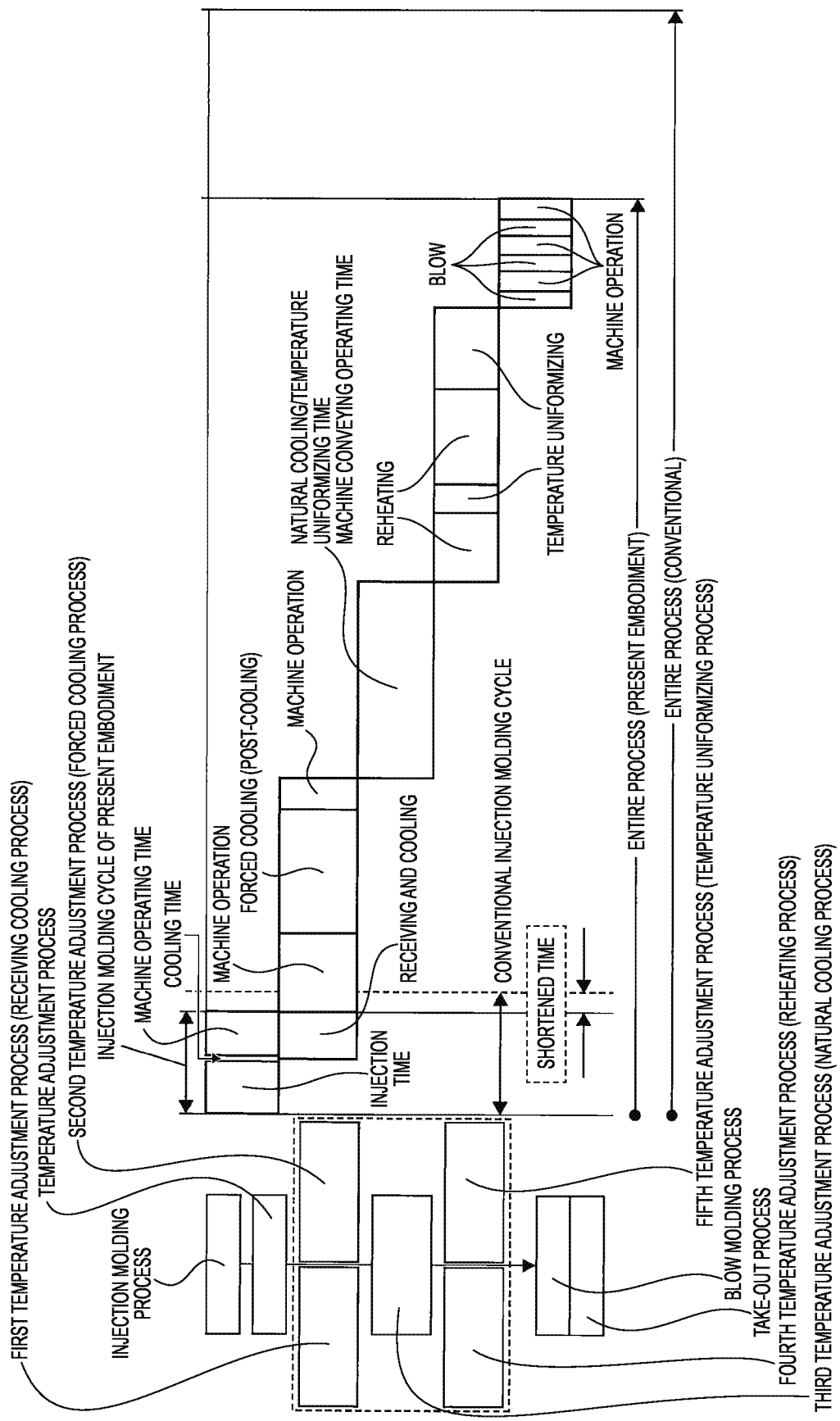
FIG. 11 shows a process diagram of an entire process.

FIG. 10 is a schematic view of a blow molding apparatus according to a second embodiment, and FIG. 11 is a process view of an entire process. Note that, in the second embodiment, parts different from the first embodiment are described, and the configurations in the drawings, which are substantially the same as the first embodiment, are denoted with the same reference signs.

In FIG. 10, process 1 indicates a preform molding process, process 2 indicates a preform post-cooling process (forced cooling process), processes 3 and 4 indicate a preform temperature equilibrium process (natural cooling process), process 5 indicates a reheating process, process 6 indicates a temperature uniformizing process, process 7 indicates a stretch blow molding process, and process 8 indicates a container take-out process. Note that, the preform molding process of process 1 corresponds to the injection molding process by the injection molding part 10 of the first embodiment, the preform post-cooling process, the preform temperature equilibrium process, the reheating process and the temperature uniformizing process of processes 2 to 6 correspond to the temperature adjustment process by the temperature adjustment part 20 of the first embodiment, the stretch blow molding process of process 7 corresponds to the blow molding process by the blow molding part 30 of the first embodiment, and the container take-out process of process 8 corresponds to the take-out process by the take-out part 40 of the first embodiment.

In the blow molding apparatus 100 of the first embodiment, the rotation plate is provided to rotate about the vertical shaft in the counterclockwise direction by 90 degrees above the injection molding part 10, the temperature adjustment part 20, the blow molding part 30 and the take-out part 40 (refer to FIG. 1). Thereby, the blow molding apparatus 100 is configured so that each of the four sets of the neck molds 50 sequentially moves to the injection molding part 10, the temperature adjustment part 20, the blow molding part 30 and the take-out part 40 with the same time and each process is performed for the preform 1 held by the neck mold 50 for the same time.

In contrast, the blow molding apparatus 200 of the second embodiment is configured so that the preform 1 is sequentially conveyed on a rail (conveyance path) and subjected to each process by an injection molding station 110, a post-cooling station 115, a temperature adjustment station (reheating station) 120, a blow molding station 130 and a take-out station, as shown in FIG. 10. Thereby, the blow molding apparatus 200 is configured so that the cooling and the temperature adjustment are sequentially performed for the preform 1 being conveyed. Note that, the post-cooling station 115 is a station that is included in a part of the temperature adjustment station 120 in a broad sense and is particularly responsible for forced cooling of the preform 1.

The blow molding apparatus 200 is configured to perform blow molding for the preform 1 injection-molded in the injection molding station 110 a plurality of times without collectively performing the temperature adjustment and the blow molding. Specifically, a plurality of M (for example, 12×3 rows=36) preforms 1 is injection-molded at one time in the injection molding station 110. However, N (for example, 12: the number of simultaneous blow moldings) preforms, smaller than, M are conveyed at one time to the temperature adjustment station 120 by the rail 6 and are temperature-adjusted therein, and N preforms are then blow-molded in the blow molding station 130. Since the preform 1 injection-molded in the injection molding station 110 is cooled in the processes 2 to 4, heating is performed in the temperature adjustment station 120 by using a heater, after the post-cooling. Note that, one molding cycle time of the blow molding apparatus 200 can be regarded as being substantially the same as the injection molding time (time of the injection molding process) of the preform 1. In addition, the number of blow moldings per one molding cycle time is defined as M/N. M/N is preferably an integer such as 2, 3 or 4 but is not limited thereto. Specifically, any number of blow moldings is possible as long as the injection-molded preforms of one batch are blow-molded a plurality of times.

Also in the blow molding apparatus 200 of the present embodiment, similar to the first embodiment, the preform 1 to be injection-molded is demolded from the injection molding station 110 in a soft state where the preform has heat amount of a higher temperature than the glass transition temperature of the thermoplastic synthetic resin material (for example, PET resin) (in a high temperature state where the material of the outer layer (skin layer) is solidified to a degree capable of maintaining an outer shape of the preform 1 after demolding and the material of the inner layer (core layer) is near the melting point). Specifically, the blow molding apparatus 200 is configured to take out the preform 1 from the injection molding cavity mold 12 of the injection molding station 110 before the outer surface temperature of the preform 1 molded in the injection molding station 110 becomes higher than the inner surface temperature of the preform 1 molded in the injection molding station 110, to rapidly cool the preform in the preform post-cooling process of process 2, and to naturally cool the preform in processes 3 and 4 (preform temperature equilibrium process), thereby cooling the average temperature of the body portion $2b$ of the preform 1 immediately after the demolding in the injection molding process by equal to or higher than 10° C. and equal to or lower than 50° C. Thereby, the preform 1 accumulating heat during the injection molding is molded into a final container $1a$ in the blow molding station 130 while utilizing the residual heat of the inner layer.

As shown in FIG. 11, the blow molding apparatus 200 shortens the preform molding cycle (injection molding cycle) by shortening the injection molding process and by the post-cooling function of using the temperature adjustment pot mold of the temperature adjustment process. At this time, in the injection molding station 110 in which the preform 1 is molded, the cooling time is set to ⅔ or shorter, ½ or shorter or ⅓ or shorter of the injection time (filling time), and is set preferably to be substantially zero second.

In the below, each process is described.

First, as shown in FIG. 11, in the injection molding process, the blow molding apparatus 200 injects (fills) a material into a molding space of an injection molding mold (having a configuration similar to the injection molding molds 11, 12 and 15 of the first embodiment) set to 5° C. to 20° C. for a predetermined injection time, and completes the injection molding of the preform 1 after a predetermined short cooling time extremely close to zero second. Then, the blow molding apparatus 200 takes out (demolds) the preform 1 from the injection molding station 110 into a receiving pot mold (not shown) over a predetermined machine operating time (process 1 of FIG. 10, the injection molding process of FIG. 11). For example, the injection time (filling time) is set to 3.0 seconds to 3.5 seconds, and the cooling time is set to 0.5 second to 1.0 second.

The machine operating time in the injection molding station 110 (FIG. 10) is a mold opening/closing time of the injection molding mold, and is a time for which the preform 1 is transferred from the injection molding mold to the receiving pot mold. The machine operating time is set to 3.5 seconds to 4.0 seconds, for example. When the preform 1 is taken out and conveyed by mechanical operations of an injection mold opening/closing mechanism (not shown) and the receiving pot mold, since the preform is cooled by contact with the ambient air and the receiving pot mold, the receiving and the forced cooling of the preform 1 are substantially combined in the temperature adjustment process (the first temperature adjustment process (receiving cooling process) in FIG. 11). At this time, the injection molding time (a sum of the injection time, the cooling time and the machine operating time) of the present embodiment is set to a time shorter than the injection molding time (conventional injection molding cycle) of the conventional art (WO 2012/057016 A).

When the receiving cooling process is performed, the blow molding apparatus 200 (FIG. 10) retreats the preform 1 from the injection molding station 110 while being received in the receiving pot mold and transfers the preform 1 to the temperature adjustment station 120 by a conveying member (not shown). By using the machine operating time, the temperature uniformizing treatment of the preform 1 is performed. At this time, the temperature of the outer layer (skin layer) of the preform 1 rises by 80° C. or more by the heat transfer from the inner layer (core layer), as compared to the temperature immediately after demolding from the injection molding station 110.

When the first temperature adjustment process is completed, the blow molding apparatus 200 performs the forced cooling process (post-cooling process) for the preform 1 carried into the temperature adjustment cavity mold 22 (cooling pot mold) of the temperature adjustment station 120, more specifically, the post-cooling station 115 (process 2 of FIG. 10, the second temperature adjustment process of FIG. 11 (forced cooling process)). The outer surface-side of the preform 1 comes into contact the temperature adjustment cavity mold 22 set to the glass transition temperature of the material or lower (for example, 60° C. or lower), and the preform 1 is and forcibly cooled.

When the second temperature adjustment process is completed, the blow molding apparatus 200 (FIG. 10) transfers the preform 1 to the conveying member (not shown) standing by on the rail 6 by a machine operation such as inverting/lowering of the temperature adjustment cavity mold 22 (process 3 of FIG. 10). Then, the blow molding apparatus conveys the preform 1 to the temperature adjustment station 120 along the rail 6 together with the conveying member by an electric motor or a machine operation by a sprocket or the like (process 4 of FIG. 10). During the machine operation time (for example, 3.5 seconds to 4.0 seconds), the blow molding apparatus 200 naturally cools and temperature-uniformizes the preform 1 immediately after the post-cooling process is over until just before the reheating process starts in the temperature adjustment station 120 (the third temperature adjustment process of FIG. 11 (natural cooling process)).

When the preform 1 is cooled and temperature-uniformized in the third temperature adjustment process, the blow molding apparatus 200 performs heating and temperature uniformizing in order of reheating, temperature uniformizing and reheating for the preform 1 in the reheating process of the temperature adjustment station 120 (process 5 of FIG. 10, the fourth temperature adjustment process (reheating process)).

When the preform 1 is heated and temperature-uniformized in order of reheating, temperature uniformizing and reheating, the blow molding apparatus 200 temperature-uniformizes the preform 1 by conveying the preform along the rail 6 under atmosphere, and then carries the preform 1 into the blow molding station 130 (process 6 of FIG. 10, the fifth temperature adjustment process of FIG. 11 (temperature uniformizing process)). Immediately before the blow molding, the heat transfer is caused between the inner and outer layers (between the skin layer and the core layer) of the preform 1 or in the thickness direction of the body portion 2b, so that the temperature difference between the inner and outer layers is reduced and equilibrium stabilization of the temperature distribution of the preform 1 can be performed. Therefore, it is possible to optimize the temperature condition of the preform 1 immediately before the blow molding. Note that, the process time is set to 1.0 seconds to 2.0 seconds, for example.

When the preform 1 is carried into the blow molding station 130, the blow molding apparatus 200 blow-molds the preform 1 to mold the container 1a in the blow process (process 7 of FIG. 10, the blow molding process of FIG. 11).

When the preform 1 is blow-molded to mold the container 1a, the blow molding apparatus 200 carries out and takes out the container by a machine operation (process 8 of FIG. 10, the acquisition process of FIG. 11). Note that, in the present embodiment, for the M (for example, 36) preforms 1 injected at one time in the injection process, the temperature adjustment process, the natural cooling process, the reheating process and the blow process are performed for the N (12) preforms smaller than M each time. At this time, the temperature adjustment process, the natural cooling process, and the reheating process are continuously performed as the preforms 1 are conveyed along the rail 6. However, in the blow process, the blow molding is divided into three times and is each performed for the 12 preforms.

By the above processes, the time required for the entire process where the cycle by the blow molding apparatus 200 is shortened is shorter than the time required for the entire process by the conventional apparatus.

Figure 12:
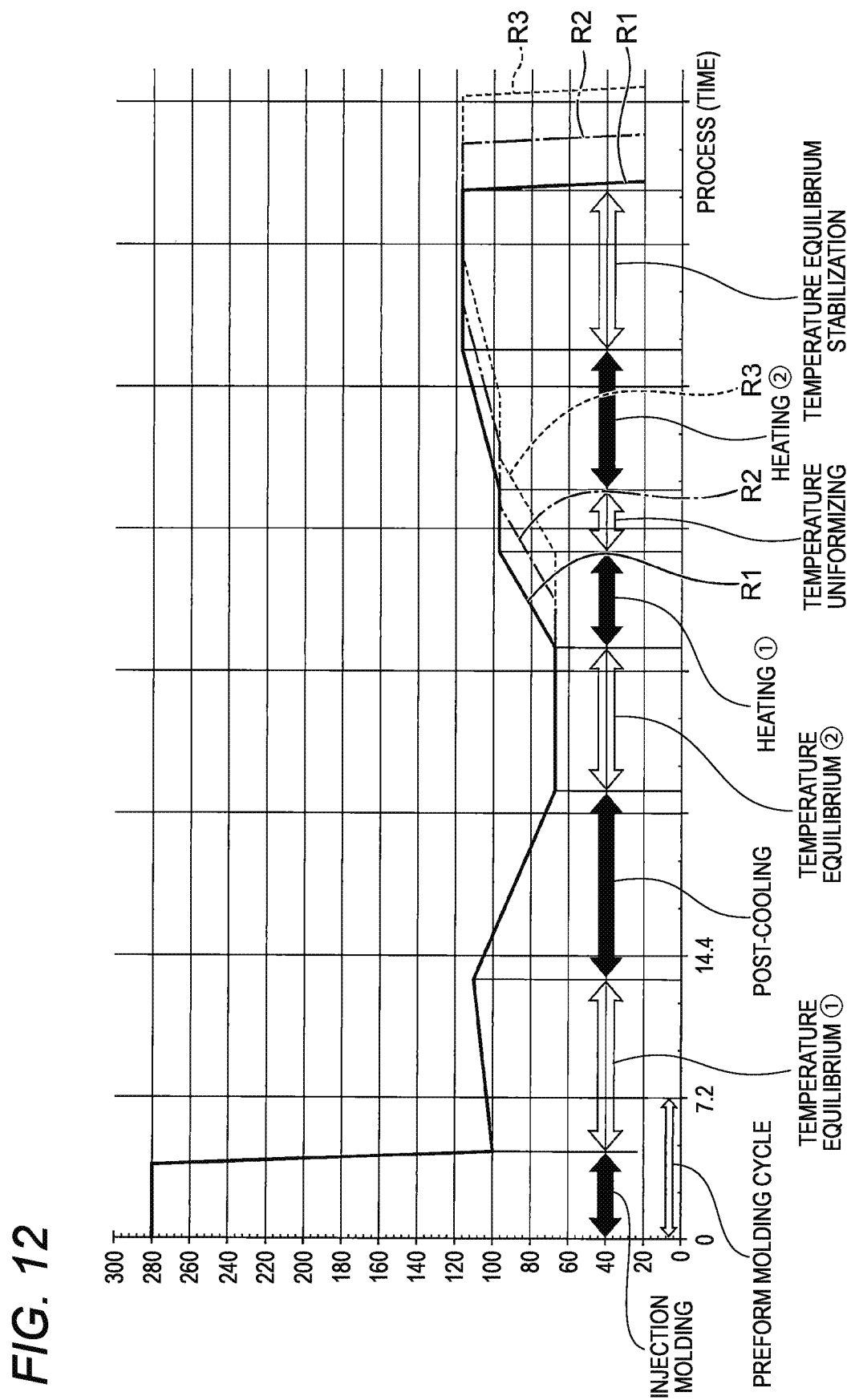
FIG. 12 shows a change in temperature of the preform in the entire process.

FIG. 12 shows a change in average temperature of the body portion 2b of the preform 1 during the entire process. In FIG. 12, the horizontal axis indicates time, and the vertical axis indicates temperature of the preform 1. Here, an injection molding process corresponds to process 1 of FIG. 10 (the injection molding process of FIG. 11), a temperature equilibrium process 1 corresponds to process 1 of FIG. 10 (the first temperature adjustment process of FIG. 11), a post-cooling process corresponds to process 2 of FIG. 10 (the second temperature adjustment process of FIG. 11), a temperature equilibrium process 2 corresponds to process 4 of FIG. 10 (the third temperature adjustment process of FIG. 11), a heating process 1, a temperature uniformizing process and a heating process 2 correspond to process 5 of FIG. 10 (the fourth temperature adjustment process of FIG. 11), and a temperature equilibrium stabilization process corresponds to process 6 of FIG. 10 (the fifth temperature adjustment process of FIG. 11).

As shown in FIG. 12, it can be seen that the preforms 1 injection-molded at the same time in the injection molding process are subjected to each process on the same conditions up to the temperature equilibrium process but are divided into three groups and are then subjected to each process after the heating process 1. Specifically, among the 36 preforms 1 injection-molded at one time in the injection molding process, the 12 preforms changes in temperature as shown with route R1, another 12 preforms changes in temperature as shown with route R2, and the other 12 preforms changes in temperature as shown with route R3. Here, the preforms are stabilized to a state where there is almost no temperature difference among the preforms in the temperature equilibrium process 2, and then, the preforms are divided into each of the routes R1, R2 and R3. The preforms 1 are rapidly cooled to an optimum blow temperature or lower in the post-cooling process of the temperature adjustment station 120, so that differences of temperature unevenness (heat history) among the preforms 1 originating from the injection molding process can be efficiently (aggressively) reduced. In addition, from the injection molding station 110 to the reheating process of the temperature adjustment station 120, the preforms 1 are temperature-uniformized as the temperature unevenness is reduced, and are sufficiently cooled to temperatures near or below the glass transition temperature. Thereby, since a temperature decrease ratio (temperature gradient) of the preform 1 relative to the time axis becomes gentle, the temperature histories of the preforms 1 on each of the routes R1, R2 and R3, which are carried in/out at different times in the reheating process, can be set to be substantially the same. Specifically, the preforms 1 via each of the routes R1, R2 and R3 can be adjusted to substantially the same temperature, so that the final containers 1a have substantially the same qualities. Note that, the preform 1 is preferably carried into the blow molding station 130 at a lower temperature than that of the conventional art and in a stretchable state. Therefore, in the blow molding apparatus 200 of the present embodiment, the power consumption of the heater in the reheating process can be reduced, as compared to the apparatus of the conventional art.

FIG. 13 shows examples of the neck mold and the preform.

As shown in FIG. 13, the neck mold of the blow molding apparatus 200 is applied with a lip mold design to enable a maximum number of cavities and a maximum neck size in a small-sized mold clamping apparatus. Note that, in FIG. 13, (a) of FIG. 13 shows a first lip mold (standard lip mold) where a support ring of the preform 1 is set on a parting line (PL) with the injection cavity mold, (b) of FIG. 13 shows a second lip mold (single lip mold) where an upper body portion below a support ring has an inverted tapered design to enable formation of the preform 1 suitable for a large-sized (capacity) container, and (c) of FIG. 13 shows a third lip mold (double lip mold) where a size of a lip mold is reduced to arrange two diameter-reduced portions (a tapered portion and an inverted tapered portion) at upper and lower stages, thereby reducing a mold clamping force during injection molding of the preform 1.

The blow molding apparatus 200 of the present embodiment changes the concept of shortening the cycle time when using the conventional thin preform. The blow molding apparatus 200 adopts the preform design of the high stretch ratio (the body portion is thicker and shorter than the conventional body portion), thereby improving the degree of orientation. Specifically, by using a low-temperature stretch blow characteristic that the shaping temperature is lowered during a high-ratio stretch, it is possible to improve the degree of orientation of the synthetic resin material, thereby manufacturing a container having high physical properties (rigidity). In addition, since the temperature adjustment station 120 has the reheating process, it is possible to use the second lip mold of the inverted tapered design where the upper body portion of the preform 1 is cooled to the optimum blow temperature or lower and the third lip mold (double tapered lip and the like) of the design where the mold clamping force is reduced.

Further, since the blow molding apparatus 200 can perform the blow molding process a plurality of times (for example, three times) during one injection molding process, it is possible to reduce the power consumption associated with the manufacturing of each bottle container 1a as the production amount of the bottle container 1a is increased. For example, in the present embodiment where the cooling time in the injection molding station 110 is shortened and the preform 1 designed into a thick and short shape, the molding cycle time can be shortened to about 7 seconds from about 11 seconds of the conventional art. Thereby, the production amount of the bottle container 1a per unit time can be increased from about 13,000 to about 18,000. While the power consumption per unit time of the blow molding apparatus 200 is substantially the same, since the production amount can be increased by about 38%, the power consumption associated with the manufacturing of each bottle container 1a can be reduced by about 38% as compared to the conventional art.

Further, since the blow molding apparatus 200 has the multistage temperature adjustment processes (the post-cooling process, the plurality of temperature uniformizing processes, the reheating process and the temperature equilibrium stabilization process) and the plurality of temperature uniformizing processes using the machine operating time between the injection molding process and the blow molding process, it is possible to select a shape of the preform 1 irrelevant to the design of the neck mold (lip mold) and to secure the sufficient heating time capable of adjusting the temperature distribution.

The synthetic resin material that forms the preform 1 is not limited to PET. For example, as the synthetic resin material other than PET, PEN (polyethylene naphthalate), PC (polycarbonate), Tritan, PP (polypropylene), PE (polyethylene), PCLA (polycyclohexylene dimethylene terephthalate) and the like can be used.

REFERENCE SIGNS LIST

1: preform
1a: container
2: storage portion
2a: body portion
2b: bottom portion
3: neck portion
4: gate
5: wall portion
6: rail
10: injection molding part
11: injection core mold
12: injection cavity mold
20: temperature adjustment part
21: temperature adjustment core mold
22: temperature adjustment cavity mold
30: blow molding part
31: blow mold
40: take-out part
50: neck mold
61: air introduction member
62: rod member
62a: inner flowing port
63: fitting core 64: outer flowing port
100: blow molding apparatus
101: injection molding process
102: first temperature uniformizing process
103: temperature adjustment process
104: blow molding process
105: acquisition process
106: second temperature uniformizing process
110: injection molding station
115: post-cooling station
120: temperature adjustment station
130: blow molding station
200: blow molding apparatus
Z: axis center

The invention claimed is:

1. A manufacturing method for manufacturing a resin container, the manufacturing method comprising:
injection-molding a preform;
adjusting a temperature of the preform to which the injection-molding has been performed in a temperature adjustment part; and
blow-molding the preform whose temperature has been adjusted;
wherein the preform is carried into the temperature adjustment part before an outer surface temperature of the preform to which the injection-molding has been performed becomes higher than an inner surface temperature of the preform to which the injection-molding has been performed; and
wherein, in the temperature adjustment part, the preform is cooled so that at least the outer surface temperature of the preform is lowered within a temperature range from 10° C. to 50° C. as compared to the outer surface temperature of the preform when the preform is carried into the temperature adjustment part.

2. The manufacturing method for manufacturing a resin container according to claim 1,
wherein in a case where a glass transition temperature of a resin material for molding the preform is equal to or higher than 50° C. and equal to or lower than 150° C. and a thickness of the preform is equal to or greater than 1.5 mm and equal to or smaller than 4.0 mm, the preform is carried into the temperature adjustment part in a state where the outer surface temperature of the preform is equal to or higher than 110° C. and equal to or lower than 150° C.

3. The manufacturing method for manufacturing a resin container according to claim 1,
wherein in a case where a glass transition temperature of a resin material for molding the preform is equal to or higher than 50° C. and equal to or lower than 150° C. and a thickness of the preform is equal to or greater than 3.0 mm and equal to or smaller than 10.0 mm, the preform is carried into the temperature adjustment part in a state where the outer surface temperature of the preform is equal to or higher than 100° C. and equal to or lower than 140° C.

4. The manufacturing method for manufacturing a resin container according to claim 1,
wherein the temperature adjustment part is configured to cool the preform by sandwiching the preform with a temperature adjustment core mold and a temperature adjustment cavity mold to compression-deform the preform.

5. The manufacturing method for manufacturing a resin container according to claim 1,
wherein the temperature adjustment part is configured to cool the preform by circulating air inside the preform.

* * * * *